(12) United States Patent
Martyn

(10) Patent No.: US 10,253,854 B2
(45) Date of Patent: *Apr. 9, 2019

(54) APPARATUS FOR CONVERTING MOTION

(71) Applicant: Ten Fold Engineering Limited, Buckinghamshire (GB)

(72) Inventor: David Martyn, Bath (GB)

(73) Assignee: Ten Fold Engineering Limited (GB)

(*) Notice: Subject to any disclaimer, the term of this patent is extended or adjusted under 35 U.S.C. 154(b) by 0 days.

This patent is subject to a terminal disclaimer.

(21) Appl. No.: 14/916,907

(22) PCT Filed: Aug. 28, 2014

(86) PCT No.: PCT/GB2014/052609
§ 371 (c)(1),
(2) Date: Mar. 4, 2016

(87) PCT Pub. No.: WO2015/033111
PCT Pub. Date: Mar. 12, 2015

(65) Prior Publication Data
US 2016/0195175 A1  Jul. 7, 2016

(30) Foreign Application Priority Data
Sep. 4, 2013  (GB) .................................. 1315702.9

(51) Int. Cl.
*F16H 21/44*  (2006.01)
*F16H 21/04*  (2006.01)
(Continued)

(52) U.S. Cl.
CPC ............. *F16H 21/44* (2013.01); *E01D 15/00* (2013.01); *E04H 3/126* (2013.01); *F16H 21/02* (2013.01);
(Continued)

(58) Field of Classification Search
CPC .......... F16H 21/44; F16H 21/02; F16H 21/04; F16H 21/10; E01D 15/00; E04H 3/126; Y02B 10/20
(Continued)

(56) References Cited

U.S. PATENT DOCUMENTS

| 2,506,151 A | 5/1950 | Hoven et al. |
| 3,253,473 A | 5/1966 | Chisholm |

(Continued)

FOREIGN PATENT DOCUMENTS

| DE | 19542229 A1 | 5/1997 |
| FR | 2243375 A1 | 4/1975 |

(Continued)

OTHER PUBLICATIONS

Patents Act 1977: Search Report under Section 17, application No. GB1415354.8, dated Mar. 4, 2015, 2 pages.
(Continued)

*Primary Examiner* — Theodore V Adamos
(74) *Attorney, Agent, or Firm* — Jason Saunders; Christopher McKeon; Arnold & Saunders, LLP

(57) ABSTRACT

An assembly for converting motion comprises a first arm rotatable about a first fixed pivot; a second arm rotatable about a second fixed pivot spaced apart from the first fixed pivot. A third arm pivotably connects to the second arm. A fourth arm pivotably connects to the first arm. A first connecting arm extends between the first arm and the third arm, the first connecting arm pivotably connected to the first arm and pivotably connected to the third arm. A second connecting arm extends between the first arm and the second arm, the second connecting arm pivotably connected to the first arm disposed and pivotably connected to the second arm. The third arm connects to a first position on a component to be moved relative to the first and second fixed pivots (Continued)

and the fourth arm connects at a second position thereon to a second position on the component.

21 Claims, 23 Drawing Sheets

(51) Int. Cl.
*F16H 21/02* (2006.01)
*F16H 21/10* (2006.01)
*E01D 15/00* (2006.01)
*E04H 3/12* (2006.01)

(52) U.S. Cl.
CPC ............ *F16H 21/04* (2013.01); *F16H 21/10* (2013.01); *Y02B 10/20* (2013.01)

(58) Field of Classification Search
USPC ................................. 52/69, 645, 71, 109, 9
See application file for complete search history.

(56) References Cited

U.S. PATENT DOCUMENTS

| | | | |
|---|---|---|---|
| 3,968,991 A | 7/1976 | Maclaren | |
| 4,248,103 A | 2/1981 | Halsall | |
| 4,400,985 A * | 8/1983 | Bond | B65G 47/904 414/744.5 |
| 4,557,083 A * | 12/1985 | Zanardo | B64G 9/00 244/159.5 |
| 4,747,353 A | 5/1988 | Watt | |
| 4,819,399 A * | 4/1989 | Onoda | B64G 9/00 52/645 |
| 5,102,290 A | 4/1992 | Cipolla | |
| 5,219,410 A | 6/1993 | Garrec | |
| 5,237,887 A | 8/1993 | Appleberry | |
| 5,485,763 A | 1/1996 | Pincus | |
| 8,813,455 B2 * | 8/2014 | Merrifield | E04C 3/02 135/144 |
| 9,376,800 B2 * | 6/2016 | Martyn | E04B 1/3441 |
| 9,528,579 B2 * | 12/2016 | Martyn | F16H 21/04 |
| 2005/0204681 A1 | 9/2005 | Zeigler | |
| 2016/0186842 A1 * | 6/2016 | Martyn | F16H 21/04 74/99 R |

FOREIGN PATENT DOCUMENTS

| | | | |
|---|---|---|---|
| FR | 2557003 A1 | 6/1985 | |
| GB | 2437494 A | 10/2007 | |
| GB | 2502788 A | 12/2013 | |
| GB | 2505206 A | 2/2014 | |
| GB | 2505676 A | 3/2014 | |
| GB | 2514175 A | 11/2014 | |
| JP | 2003065415 A | 3/2003 | |
| SU | 1044871 A1 | 9/1983 | |
| WO | 199733725 A1 | 9/1997 | |
| WO | 199914018 A1 | 3/1999 | |
| WO | 2013182834 A1 | 12/2013 | |

OTHER PUBLICATIONS

Patents Act 1977: Search Report under Section 17, application No. GB1315702.9, dated Mar. 28, 2014, 2 pages.
International Search Report, PCT/GB2014/052609, dated Nov. 18, 2014, 4 pages.
Dijksman, E.A., "The Straight-line Linkages Having a Rectilinear Translating Bar," Precision Engineering, Faculty of Mechanical Engineering, Eindhoven University of Technology, The Netherlands, Advances in Robot Kinematics and Computationed Geometry,1994, Kluwer Academic Publishers, pp. 411-420.
International Search Report, PCT/GB2014/052639, dated Nov. 18, 2014, 5 pages.
Straight line mechanism of James Watt: Wattt's linkage https://en.wikipedia.org/wiki/Watt%27s_linkage 4 pages, Dec. 19, 2015.
Linkage of Tchebicheff: Chebyshev linkage https://en.wikipedia.org/wiki/Chebyshev_linkage 3 pages, Jan. 9, 2016.
Peaucellier-Lipkin inversor: Peaucellier-Lipkin linkage https://en.wikipedia.org/wiki/Peaucellier%E2%80%93Lipkin_linkage 4 pages, Jan. 28, 2016.
Mechanism of Hart: Hart's inversor https://en.wikipedia.org/wiki/Hart%27s_inversor 1 page, Feb. 5, 2016.
Scott Russell linear converter: Scott Russell linkage https://en.wikipedia.org/wiki/Scott_Russell_linkage 1 page, Oct. 14, 2015.

* cited by examiner ical linkage is described and shown in U.S. Pat.
APPARATUS FOR CONVERTING MOTION The present invention relates to an apparatus for converting motion, in particular an apparatus for producing motion of a component in a straight line generated by the rotational movement of a second component or the motion of the second component about a pivot.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E.A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of inter-connected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for limited movement of the moveable member in a straight path with respect to the fixed member.

JP 2003065415 discloses a quick return, parallel displacement motion mechanism.

SU 1044871 discloses an articulated lever mechanism with a crank and conrod.

There is a need for an improved assembly for providing a straight line motion, in particular for providing an element moveable in a straight line in response to a rotational motion. It would be most advantageous if the assembly could be arranged in a compact form, thereby occupying only a small volume of space.

An assembly for converting a rotary motion into a straight line motion which relies upon an assembly of five levers or arms having pivoted connections therebetween is described and shown in pending United Kingdom Patent Application No. GB1209982.6. The assembly for converting motion comprises:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon; and a second connecting arm extending between the first arm and the second arm, the second connecting arm pivotably connected to a third position on the first arm disposed between the first and second positions thereon and pivotably connected to a third position on the second arm.

This assembly is also described and shown in the related international patent application PCT/GB/2013/000250. This assembly will be referred to in the present specification by reference to the application number, GB1209982.6, for the sake of brevity.

The assembly of GB1209982.6 provides a particularly versatile linkage for movement of one component with respect to another through a range of motion, including a substantially straight line. However, a modification to the assembly of GB1209982.6 has now been found. The modification provides for movement of a component substantially perpendicular to the line joining two fixed pivots. Advantageously, two of the modified assemblies may be interconnected between a pair of fixed pivots and a component to be moved. Such an arrangement provides the component with a motion that is precisely perpendicular to the line joining the two fixed pivots, without deviation therefrom as is the case with the earlier assemblies.

According to the present invention, there is provided an assembly for converting motion, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a fourth arm pivotably connected at a first position thereon to the first arm at a second position on the first arm, the second position spaced apart from the first position on the first arm;

a first connecting arm extending between the first arm and the third arm, the first connecting arm pivotably connected to a third position on the first arm spaced apart from the first position on the first arm, the first connecting arm pivotably connected to the third arm at a second position thereon spaced apart from the first position thereon; and a second connecting arm extending between the first arm and the second arm, the second connecting arm pivotably connected to a fourth position on the first arm disposed between the first and second positions thereon and pivotably connected to a third position on the second arm;

the third arm being adapted to connect at a third position thereon to a first position on a component to be moved relative to the first and second fixed pivots; and the fourth arm being adapted to connect at a second position thereon to a second position on the component.

In operation of the assembly, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is the end furthest from the first and second fixed pivots and distal from the first and second positions on the third arm, preferably with the said point being located at the free end of the third arm or in an end portion at the free end of the arm.

The extent of the straight line motion of the said point on the third arm varies according to the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

An object to be moved relative to the fixed pivots is connected to the third arm at a third position of the third arm. Preferably, the third position on the third arm is in the region of, most preferably at, the said point. Further, the object to be moved is connected to a second position on the fourth arm. This second position is conveniently in the region of or at the distal end of the fourth arm, that is the end of the arm furthest from the first and second fixed pivots.

The assembly of GB1209982.6, from which the assembly of the present invention is derived, provides a number of significant advantages, in particular compared with the linkages and mechanisms of the prior art, such as those discussed above. First, in preferred embodiments of the assembly, the said point on the third arm moves in a substantially straight line extending perpendicular to the line joining the first and second fixed pivots. This is a particularly advantageous arrangement, for example when employing the assembly in a building to provide movement of one portion of the building with respect to another, such as moving a portion of the building laterally from a fixed building structure.

Second, the assembly of GB1209982.6 may be arranged such that the arms of the assembly are accommodated one within the other in a very compact configuration, for example all lying between the first and second fixed pivots. This compactness is a significant advantage of the assembly of this invention.

Further, the said point on the third arm of the assembly of GB1209982.6 may be arranged to always be the forward-most point of the assembly in the direction of motion of the said point. This arrangement provides significant advantages over known assemblies, where the point moving in a straight line is contained within or otherwise surrounded by other components of the assembly. In particular, the point of the assembly of the assembly of GB1209982.6 that traces a straight line moves away from the mechanism, that is leads the mechanism in the direction of motion of the said point. As noted, the assembly may be considered to be movable from a retracted position to an extended position, with a point on the third arm moving in a straight line between the retracted and extended positions. The point on the third arm moves in a straight line away from the retracted position to the extended position. In particular, the assembly is such that, in operation, a point on the third arm traces a straight line that extends away from the first and second fixed pivot points, in particular from the line joining the first and second pivot points. More particularly, in many embodiments, the straight line path followed by the said point on the third arm extends perpendicular to the line joining the first and second pivot points. This is an advantage over assemblies of the prior art and allows the assembly of the present invention to be more versatile and have a wider range of applications. Further, the assembly can be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

Further, the arms of the assembly of GB1209982.6 may be constructed such that the arms may be accommodated one within another. The components of the assembly may be arranged such that, when in the retracted position, the third arm and first and second connecting arms are accommodated within or adjacent the first and second arms, thereby providing for a particularly compact assembly when in the retracted position.

The assembly of the present invention provides all the advantages of the assembly of GB1209982.6 summarised above. However, the assembly of the present invention provides a number of further advantages. First, the object to be moved is connected to the third and fourth arms at the third and second positions thereon, respectively. This provides the object with a particular orientation relative to the fixed pivots. The object may be moved away from and towards the fixed pivots and held in the said orientation. In one particularly advantageous arrangement, the line joining the third position on the third arm and the second position on the fourth arm is parallel to the line joining the first and second fixed pivots. In this way, the aforementioned lines remain parallel throughout the motion of the assembly with respect to the fixed pivots.

Further, as described in more detail below, it has been found that two assemblies of the present invention may be connected end to end, in particular such that the third position on the third arm and the second position on the fourth arm of a first assembly form the fixed pivots for the second assembly. Most surprisingly, it has been found that this arrangement allows an object connected to the second assembly to move along a straight line with respect to the first and second fixed pivots of the first assembly, without any deviation from the straight line, in particular along a line that is perpendicular to the line joining the first and second fixed pivots. This arrangement is a particularly versatile assembly finding use in many applications on a very wide range of scales.

Still further, it has been found that the assembly of the present invention may be locked simply by connecting the first and second arms together and/or by connecting the third and fourth arms together, in particular by rigidly connecting the aforementioned arms at the points at which they cross. This locked arrangement is fully triangulated and is particularly strong in supporting the object to be moved relative to the first and second fixed pivots.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 2334 mm and the first, second, third and fourth arms each are 2238 mm in length, the said point on the third arm and the point on the fourth arm each describes an approximate straight line of 3093 mm in length. In particular, the points move between a first or retracted position and a second or extended position. In this respect, references to motion of the points are with respect to the line joining the first and second fixed pivots, with the retracted position being at or close to the line joining the first and second fixed pivots and the retracted position being distant therefrom. As noted, the points on the third and fourth arms move between the retracted position and the extended position, with the line joining the retracted and extended positions being a straight line perpendicular to the line extending between the first and second pivots. However, in moving between the retracted and extended positions, the points follow a sine wave having a maximum deviation from the straight line of 111 mm. This deviation represents a deviation of just 3.6% of the distance travelled by the said point between the retracted and extended positions and is generally insignificant in the context of most if not all practical applications of the assembly.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the third arm follows a substantially straight line. Other points on the third arm follow a respective arc.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted above, the assembly of the present invention provides a motion of the said point on the third arm that follows a straight line over a specific extent of its movement. The close approximation of the movement of the said point on the third arm to a straight line between the retracted and extended positions makes the assembly of the present invention particularly useful as a straight line converter, that is able to convert a rotational movement of the first and/or second arms about the first and second fixed pivots respectively, into a straight line motion of the said point on the third arm.

As noted, operation of the assembly results in motion of the third and fourth arms. It is to be understood that the assembly may be used to convert a rotational motion of the first or second arms about the first or second fixed pivots into a motion of the said point on the third arm and the fourth arm, that is by having drive to the assembly provided at the first or second arms. Alternatively, the assembly may be used to convert a motion of the third arm and/or fourth arms into a rotational motion of the first and second arms, that is by having drive to the assembly applied at the third arm and/or the fourth arm.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move.

The first position on the first arm may be at any suitable location thereon. In one preferred embodiment, the first position is at or adjacent the first end of the first arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. In many embodiments of the assembly of the present invention the first arm operates as a driving arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move.

The first position may be in any suitable location on the second arm. In one preferred embodiment, the first position is at or adjacent one end of the second arm.

The second arm is moveable about the second fixed pivot under the action of either movement of the first arm, the third arm or the fourth arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. In many embodiments of the assembly of the present invention the second arm operates as a driving arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm, in particular the end of the third arm that is proximal of the first and second fixed pivots.

The second position on the second arm is spaced apart from the first position on the second arm. In one preferred embodiment, the second position on the second arm is at or adjacent the second end of the second arm, that is the end of the arm that is distal of the second fixed pivot.

In operation of the assembly, as noted above, the third arm has a point thereon that follows the path of a straight line when the assembly is moved between the retracted and extended positions. This point on the third arm is spaced apart from the first position on the third arm, that is the position on the third arm at which the second and third arms are pivotably connected together.

The third arm may be a driven arm, that is moved under the action of movement of the first and second arms. In this case, rotation of the first arm about the first fixed pivot causes the third arm to move, such that the said point on the third arm follows the straight line path between the retracted and extended positions. Alternatively, the third arm may be a driving arm, that is have a force applied thereto resulting in movement of the third arm, which in turn drives the other components of the assembly to result in movement of the first arm about the first fixed pivot. For example, application of a straight line force to the said point on the third arm between the retracted and extended positions results in rotational movement of the first arm about the first fixed pivot and rotation of the second arm about the second fixed pivot.

The third arm is connected to an object to be moved relative to the first and second fixed pivots. The connection between the third arm and the object is preferably in the region of, more preferably at, the said point on the third arm that moves in a straight line. As noted, the connection between the third arm and the object is preferably at the end of the third arm that is distal of the first and second fixed pivots.

The assembly of the present invention further comprises a fourth arm. The fourth arm may have any shape and configuration. A preferred form for the fourth arm is an elongate member, for example a bar or a rod. The fourth arm is pivotably mounted at a first position on the fourth arm to the first arm at a second position on the first arm. The pivotable connection between the first and fourth arms may be of any suitable form, preferably a pin, spindle or axle passing through the arms about which one or both of the arms are free to move.

The fourth arm is pivotably connected to the first arm at a first position on the fourth arm and a second position on the first arm. The first position may be in any suitable location on the fourth arm. In one preferred embodiment, the first position is at or adjacent one end of the fourth arm, in particular the end of the fourth arm that is proximal to the first and second fixed pivots.

The second position on the first arm is spaced apart from the first position on the first arm. In one preferred embodiment, the second position on the first arm is at or adjacent the second end of the first arm, that is the end distal of the first fixed pivot.

The fourth arm may be a driven arm, that is moved under the action of movement of the first and second arms. In this case, rotation of the first arm about the first fixed pivot causes the fourth arm to move. Alternatively, the fourth arm may be a driving arm, that is have a force applied thereto resulting in movement of the fourth arm, which in turn drives the other components of the assembly to result in movement of the first arm about the first fixed pivot and the second arm about the second fixed pivot.

The fourth arm is also connected to the object to be moved relative to the first and second fixed pivots. The connection between the fourth arm and the object is preferably in the region of, more preferably at, the end of the fourth arm that is distal of the first and second fixed pivots. It has been found that when the fourth arm is connected to the object to be moved there is a position on the fourth arm that moves in a substantially straight line, corresponding to the movement of the said point on the third arm. The connection between the fourth arm and the object is preferably in the region of, more preferably at, this position on the fourth arm.

The distance between the first and second fixed pivots and the lengths of the first, second, third and fourth arms may be selected according to the desired movement of the components to be achieved and the particular application of the assembly. Specific embodiments of the assembly are described in detail below with reference to FIG. 1.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second position on the second arm moves about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm (preferably the position on third arm at which the third arm is connected to the object to be moved), the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm has a length of about 0.975 of the length of the first and second arms. In alternative embodiments, the length of the third arm is the same as that of the first arm and/or the second arm. In one particularly preferred arrangement, the first, second and third arms are the same length.

Taking the length of the fourth arm to be the distance between the first position on the fourth arm and the point on the fourth arm that moves in a straight line (preferably the position on fourth arm at which the fourth arm is connected to the object to be moved), the length of the fourth arm will be determined by the arrangement of the first and second arms, together with the connecting arms. In some embodiments, the length of the fourth arm is less than that of the first and second arms, in particular from 0.9 to 0.99 of the length of the first and/or second arms. For example, with the first and second arms being of equal length and less than the distance between the first and second fixed pivots, the fourth arm has a length of about 0.975 of the length of the first and second arms. In alternative embodiments, the length of the fourth arm is the same as that of the first arm and/or the second arm. Preferably, the fourth arm is equal in length to the third arm.

In one particularly preferred arrangement, the first, second, third and fourth arms are the same length.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a third position on the first arm. The third position on the first arm is spaced apart from the first position on the first arm. In one preferred embodiment, the third position on the first arm is at or adjacent the second or distal end of the first arm.

The first connecting arm is further connected to the third arm at a second position on the third arm, which second position is spaced apart from the first position on the third arm.

The first connecting arm may have any suitable length. Its length is preferably the distance between the positions on the first and third arms between which the first connecting arm extends.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the third arm and the distance between the first position and the said point on the third arm is preferably less than 0.8, more preferably less than 0.75, more preferably less than 0.7. A ratio of up to 0.6 has been found to be particularly suitable. One particularly preferred embodiment of the assembly has the ratio of the distance between the first position and the second position on the third arm and the distance between the first position and the said point on the third arm about 0.55 to about 0.58.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the first connecting arm and/or the pivotable connection between the second connecting arm and the second arm is at or adjacent the second end of the second connecting arm.

The second connecting arm is connected to the first arm at a fourth position on the first arm, which fourth position is spaced apart from and between the first and second positions on the first arm.

The fourth position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the second connecting arm is a factor in determining the location of the fourth position on the first arm. Second, as with the first connecting arm, the overall strength and stability of the assembly is related to the length of the second connecting arm, with the strength and stability reducing as the length of the second connecting arm increases.

The fourth position on the first arm may be at any suitable position. In particular, the ratio of the distance between the first position and the fourth position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55.

The ratio of the distance between the first position and the fourth position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the fourth position on the first arm and the distance between the first position and the second position on the first arm about 0.4 to 0.5.

The second connecting arm is further connected to the second arm at a third position on the second arm. In one embodiment of the assembly, the third position is spaced apart from and between the first and second positions on the second arm. In an alternative, preferred embodiment, the third position on the second arm coincides with the second position on the second arm, such that the second connecting arm is connected to both the second and third arms. This arrangement has the advantage of being particularly compact.

The third position on the second arm is at or spaced from the second position on the second arm and may be at any suitable position. In particular, the ratio of the distance between the first position and the third position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the third position on the second arm and the distance between the first position and the second position on the second arm about 0.95 to 1.0.

The second connecting arm may have any suitable length. Its length is preferably the distance between the positions on the first and second arms between which the second connecting arm extends.

In one preferred embodiment, the first connecting arm and the second connecting arm are equal in length.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between any two of the arms and connecting arms. In one embodiment, a flexible tie or tether extends between the first arm and the third arm, in particular between a point on the first arm between the first and fourth positions thereon and the first position on the third arm. One preferred form for the flexible tie comprises a plurality of hingedly connected, members, such as arms or arm assemblies moveable between a folded condition when the assembly is in the retracted position and a fully extended condition in the extended position. Such members may also serve other functions. For example, they may form part of the components being moved or deployed by the assembly, such as floor, decking or roof members.

In a particularly preferred embodiment of the assembly of the present invention, the lengths of the first, second, third and fourth arms, and first and second connecting arms are selected in accordance with the above criteria and to fold up when in the retracted position to lie between the first and second fixed pivots. It is a particular advantage that the assembly can be arranged to be in such a compact form when in the retracted position. In a preferred embodiment, the first, second and third arms and first and second connecting arms are formed with portions having T and 1' shapes in cross-section, with the portions being arranged to allow the arms to be accommodated within one another when in the retracted position.

An alternative form for one or more of the arms comprises two parallel, spaced apart arm members. This form is particularly preferred for the first, second, third and/or fourth arms.

As noted above, the assembly of the present invention provides for a substantially straight line motion of the said point on the third arm and a point on the fourth arm. As also noted, the motion of these points deviates somewhat from a purely linear motion, as is the case with the assembly of GB1209982.6. However, surprisingly, it has been found that this deviation may be eliminated entirely by employing two assemblies. The first assembly is as hereinbefore described. The second assembly may be an assembly as hereinbefore described or an assembly as described in GB1209982.6.

In particular, the two assemblies are arranged such that the said point on the third arm moving in a substantially straight line and the corresponding point on the fourth arm of the first assembly form or support the fixed pivots to which the first and second arms of a second assembly are attached. In this arrangement, the second assembly may be considered to be inverted with respect to the first assembly. More particularly, the said point on the third arm of the first assembly forms the first fixed pivot, to which the first arm of the second assembly is connected, and the said point on the fourth arm of the first assembly forms the second fixed pivot, to which the second arm of the second assembly is connected. The points on the third and fourth arms are preferably connected by a rigid arm, member or component extending therebetween.

The first assembly may be considered to be fixed, that is the first and second arms rotate about the first and second fixed pivots, but are not displaced relative to the fixed pivots. The second assembly may be considered to be a moving assembly, as all arms of the second assembly both rotate about their respective pivots and are displaced relative to the fixed pivots to which the first and second arms of the first assembly are attached.

In this arrangement with the second assembly inverted with respect to the first assembly, the said points on the third and fourth arms of the second assembly move in precise straight lines.

In one embodiment in which two assemblies are combined, the first assembly is an assembly of the present invention, while the second assembly is an assembly according either the present invention or as described in GB1209982.6.

More generally, a plurality of the assemblies of the present invention may be combined in an end-to-end, inverted arrangement as described above. In arrangements that employ an even number of assemblies, the motion of the points on the third and fourth arms of the endmost moving assembly will be a precise straight line. In arrangements in which an odd number of assemblies is employed, the motion of the points on the third and fourth arms of the endmost moving assembly will be a substantially straight line, with a deviation in the form of a very low amplitude sine wave.

Combinations of assemblies of this kind may employ an assembly according to GB1209982.6 as the distal or endmost moving assembly. Objects or components to be moved or deployed may be attached to one or more of the third arms of the assemblies and/or one or more of the fourth arms, in particular at or in the region of the points on these arms that are moved in a straight line.

It is an advantage of the assembly of the present invention that it is highly scaleable and may be constructed and applied at a wide range of scales to convert motion, as described hereinbefore. As a result, the assembly finds wide applications and uses, in particular by allowing relative movement between a first component and a second component.

Accordingly, in a further aspect, the present invention provides an assembly comprising a first component and a second component, the first component being arranged for movement with respect to the second component, wherein one or more assemblies as hereinbefore described is provided between the first component and second component, operation of the assemblies providing movement of the first component with respect to the second component.

One of the first and second components is connected to the third and fourth arms of the end most moving assembly. The other of the first and second components provides the first and second fixed pivot points to which the first and second arms are pivotally connected. In this way, movement of the first component with respect to the second component is effected. As noted above, such relative movement may be effected by applying a force to the first arm, the second arm, third arm or to the fourth arm of the assembly.

In many applications, a plurality of assemblies is employed. In particular, a plurality of assemblies may be employed in a spaced apart relationship on opposing sides of an object or component to be moved. For example, a first and second assembly may be provided on opposing sides of an object to be moved with third and fourth arms of two assemblies connected to opposing sides of the object.

Applications of the assembly of the present invention to convert rotational motion to linear motion include the support and movement of building structures relative to one another.

Accordingly, the present invention further provides a building comprising:

a first building portion and a second building portion, the first building portion being moveable relative to the second building portion between a retracted position and an extended position;

wherein relative movement between the first and the second building portions and support of one of the first and second building portions with respect to the other of the first and second building portions are provided by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include balconies, floor extensions, roof extensions, canopies and the like.

Any components may be moved and supported in this manner using the assembly of the present invention. Examples include temporary installations, such as walls, partitions, barriers, and signs, such as road signs. Larger structures may be moved. For example, the assemblies hereinbefore described may be used to deploy a bridge structure, for example a portable bridge structure used to provide a temporary bridge. The assembly of the present invention may be used to move and support any item that needs to move in a straight line, for example tools, such as saws and the like, and medical equipment, such as x-ray machines and scanners. It is to be understood that the assembly is not limited to the aforementioned examples.

In a further aspect, the present invention provides a structure, such as a bridge, extendable shelter or gantry, that comprises one or a plurality of components to be deployed and a plurality of assemblies of the present invention arranged in an end-to-end configuration between the components to be deployed and a fixed support.

The assembly of the present invention in many applications will be oriented vertically, that is with the first and second fixed pivots arranged on a vertical line and the arms of the assembly moveable in a vertical plane.

However, the assembly may be employed in other orientations, including horizontally, that is with the first and second fixed pivots arranged on a horizontal line and the arms of the assembly moveable in a horizontal plane.

The principles and operation of the assembly of the present invention will be further explained by reference to the accompanying figures, in which.

Figure 1:
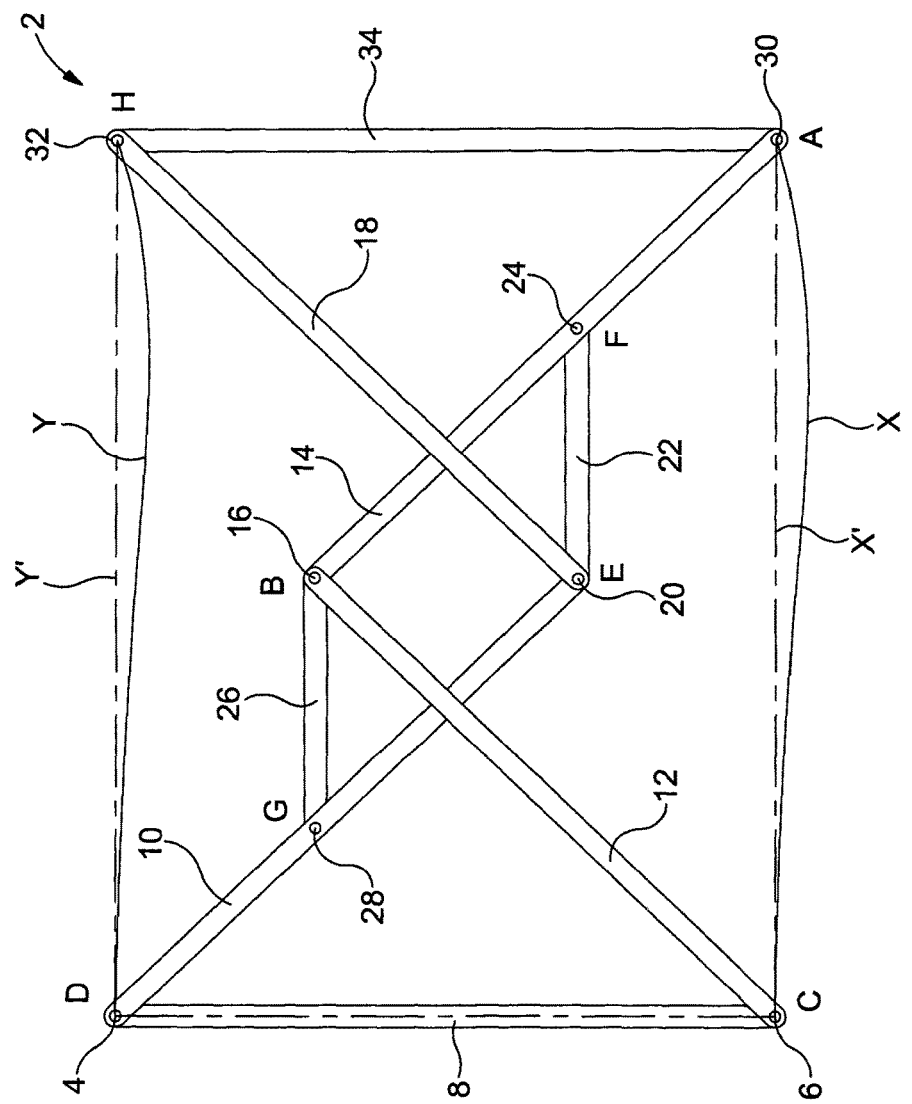
FIG. 1 is a simplified diagrammatical representation of an assembly according to the present invention in an extended position.

Turning to FIG. 1, there is shown a diagrammatical representation of an assembly of one embodiment of the present invention, generally indicated as 2. The assembly 2 is shown in an extended position. The assembly 2 is shown mounted to a fixed structure at a first fixed pivot 4 and a second fixed pivot 6. The fixed pivots 4, 6 are spaced apart and are fixed in relation to one another. The fixed pivots 4, 6 are shown in FIG. 1 rigidly attached to each other by a support arm 8. However, any other rigid member or component may be used to connect the fixed pivots 4, 6.

A first arm 10 is pivotally connected at a first position D at one end to the first fixed pivot 4. A second arm 12 is pivotally connected at a first position C at one end to the second fixed pivot 6. A third arm 14 is mounted at one end by a pivot connection 16 at the second end of the second arm 12, the position of this connection being indicated as B in FIG. 1. A fourth arm 18 is mounted at one end by a pivot connection 20 at the second end of the first arm 10, the position of this connection being indicated as E in FIG. 1.

A first connecting arm 22 is mounted at one end by the pivot connection 20 at the second end of the first arm 10. The second end of the first connecting arm 22 is mounted by a pivot connection 24 to the third arm at a position F spaced from the position B on the third arm.

A second connecting arm 26 is mounted at one end by a pivot connection 28 to the first arm 10 at a position G spaced from both positions D and E. The second end of the second connecting arm 26 is mounted by the pivot connection 16 to both the second arm 12 and the third arm 14 at position B.

The pivot connections may be formed by any suitable means, for example by pins extending through holes in the arms being pivotally joined.

In use, the third arm 14 and the fourth arm 18 are pivotably connected to an object to be moved. In particular, the third arm 14 is connected to the object by a pivot connection 30 in the distal end of the arm at a position A. Similarly, the fourth arm 18 is connected to the object by a pivot connection 32 in the distal end of the arm at a position G. The third and fourth arms may be connected to any object or component to be moved relative to the fixed pivots 4, 6. The component to be moved is shown in FIG. 1 as a support arm 34, by way of example.

Movement of the first arm 10 about the first fixed pivot 4 and the second arm 12 about the second fixed pivot 6 causes the third arm 14 to move such that the point A on the third arm moves between a retracted position and an extended position. In moving between the retracted position and the extended position, the point A on the third arm 14 describes a substantially straight line. The line of motion is indicated by the solid line X in FIG. 1, with the corresponding straight line indicated by the broken line X'. Similarly, movement of the first arm 10 about the first fixed pivot 4 and the second arm 12 about the second fixed pivot 6 causes the fourth arm 18 to move such that the point G on the fourth arm moves between a retracted position and an extended position. In moving between the retracted position and the extended position, the point G on the fourth arm 18 describes a substantially straight line. The line of motion is indicated by the solid line Y in FIG. 1, with the corresponding straight line indicated by the broken line Y'.

The support arm 34 is moved in a substantially straight line relative to the fixed pivots 4, 6. The support arm is held parallel to the line joining the fixed pivots 4, 6 throughout its motion, in the arrangement shown in FIGS. 1 and 2.

An exemplary arrangement of the assembly of FIG. 1 has the dimensions set out in Table 1.

TABLE 1

| Dimension of assembly of FIG. 1 | Length (mm) |
|---|---|
| C-D | 1300 |
| D-E | 1250 |
| C-B | 1250 |
| B-A | 1250 |
| E-H | 1250 |
| D-G | 540 |
| G-B | 500 |
| E-F | 500 |
| B-F | 710 |
| G-H | 1085 |
| X-Y | 2750 |

The arrangement of Table 1 provides movement of point A on the third arm 14 and point H on the fourth arm 18 to follow approximate straight lines X, Y perpendicular to the line joining the fixed pivots at points C and D, the straight line having a length of 1720 mm.

Figure 2:
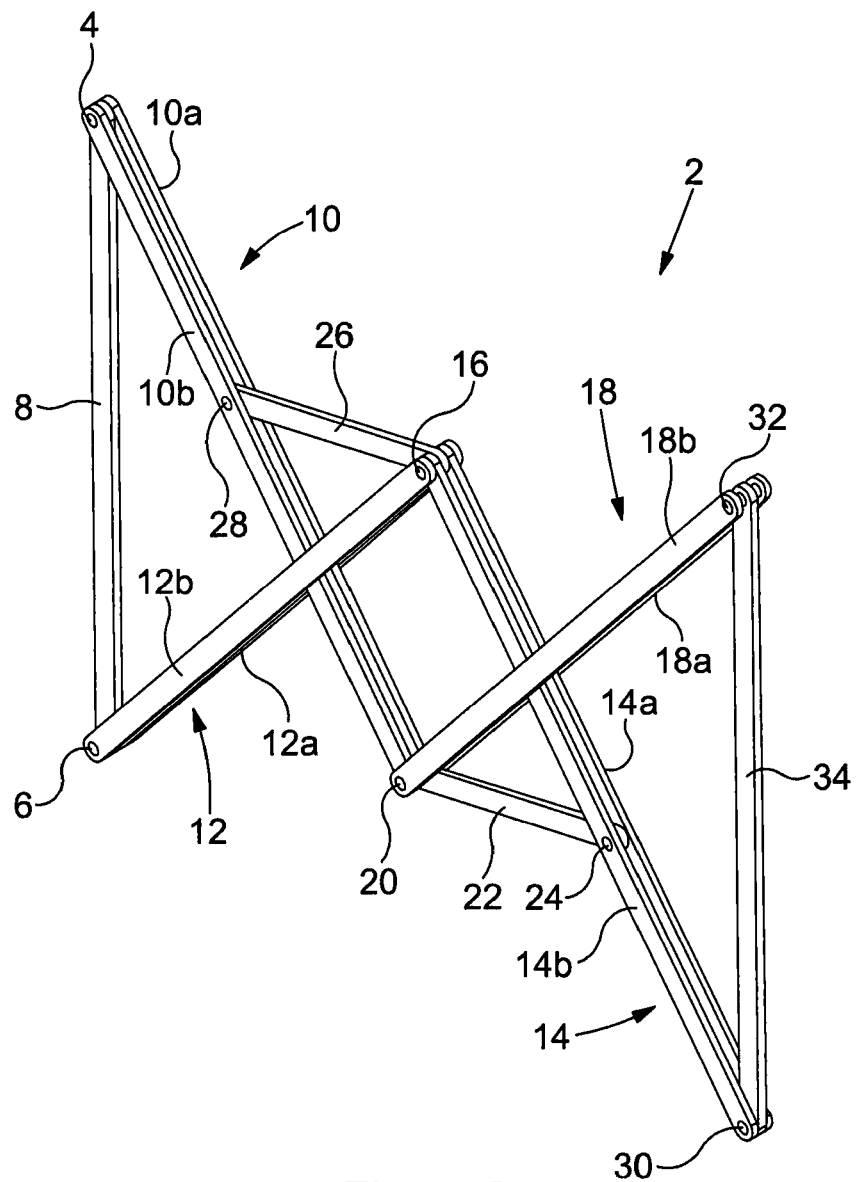
FIG. 2 is a perspective view of the assembly of FIG. 1 in an extended position.

Referring to FIG. 2, the assembly of FIG. 1 is shown in a perspective view in an extended condition. As can be seen, each of the first, second, third and fourth arms 10, 12, 14, 18 is formed from two parallel, equal length arm members 10a, 10b, 12a, 12b, 14a, 14b, 18a, 18b. As shown, the arm members 10a, 10b of the first arm 10 are arranged either side of the first and second coupling arms 22, 26. The arm members of the second, third and fourth arms are similarly arranged. In this way, the arms are able to be folded in the retracted position in a very compact arrangement.

Figure 3:
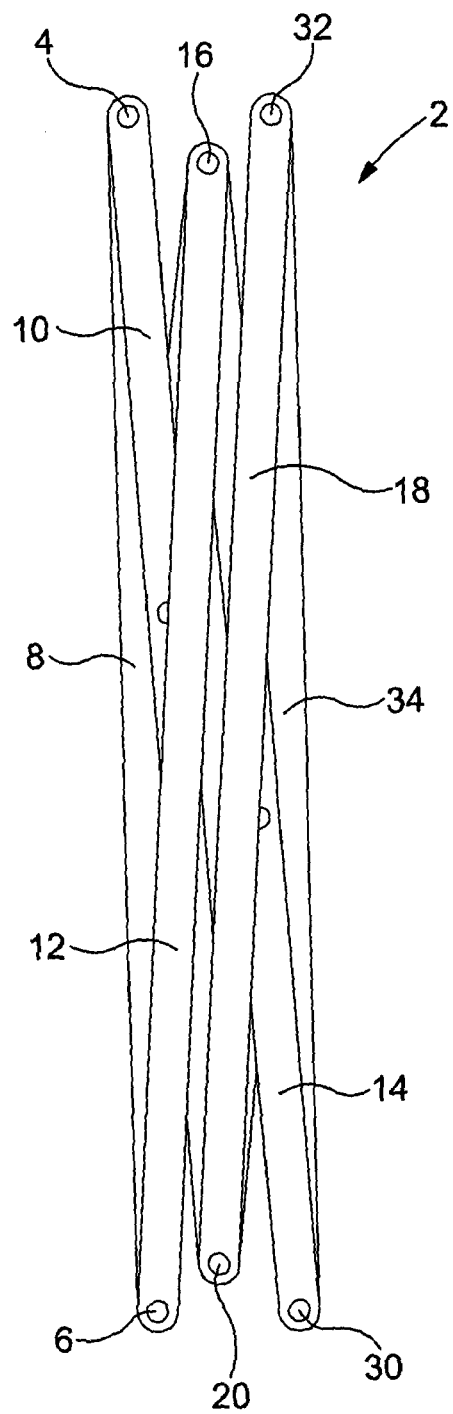
FIG. 3 is a diagrammatical representation of the assembly of FIG. 1 in a retracted position.
Figure 4:
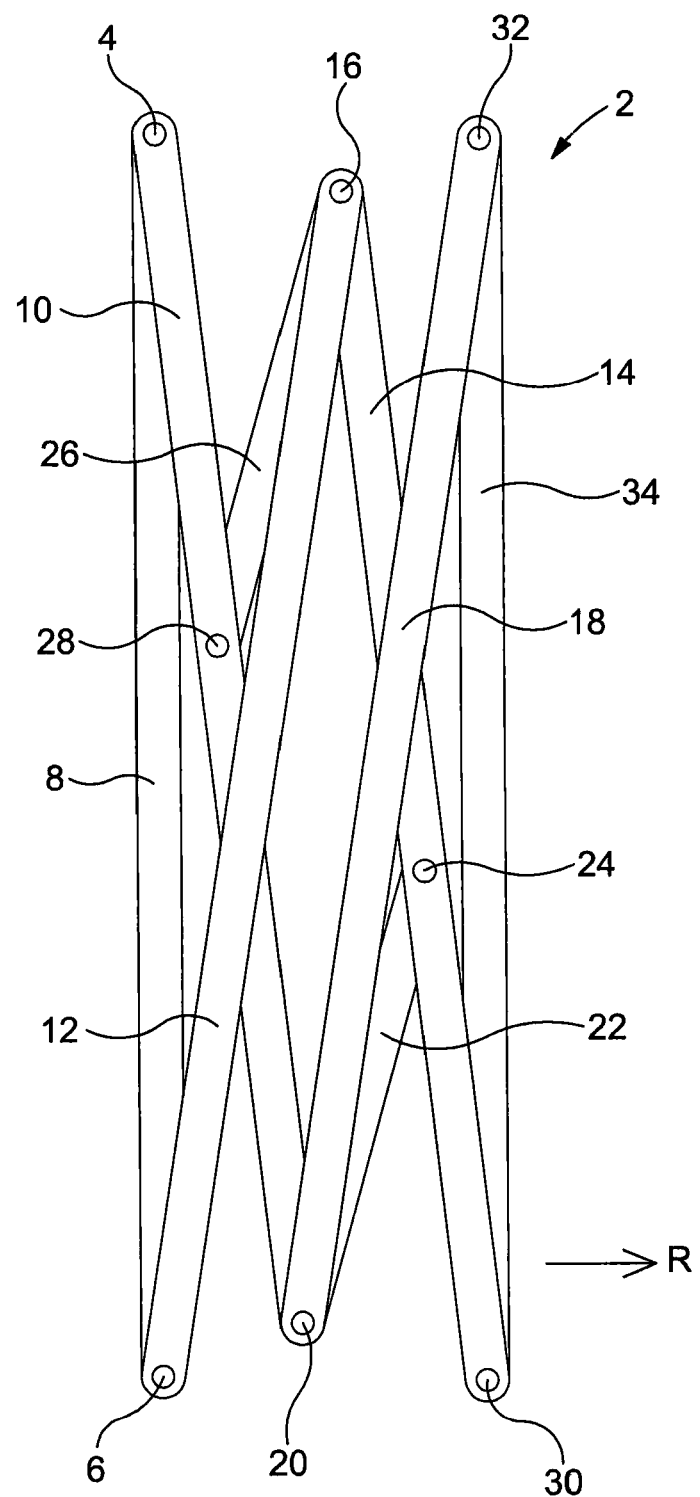
FIG. 4 is a diagrammatical representation of the assembly of FIG. 1 in a first partially extended position.
Figure 5:
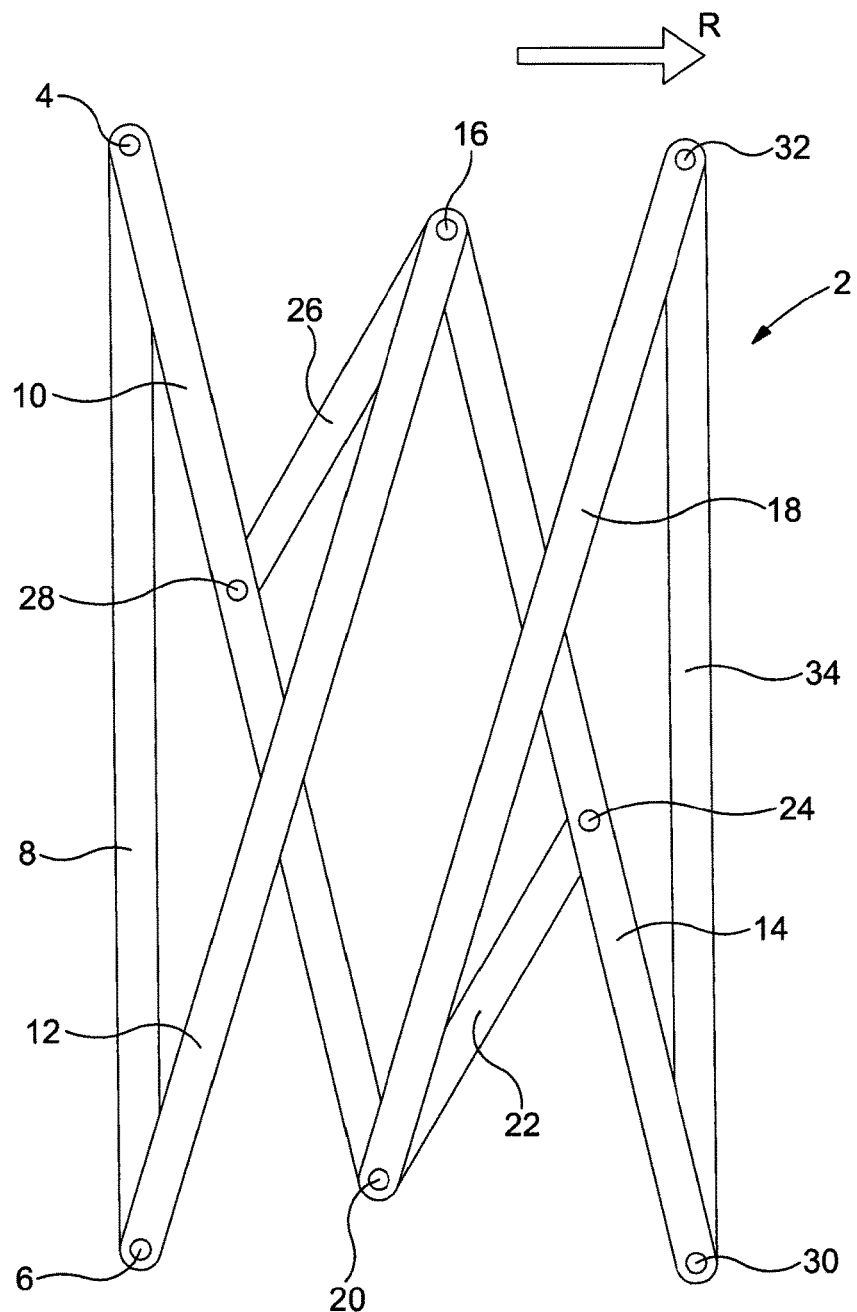
FIG. 5 is a diagrammatical representation of the assembly of FIG. 1 in a second partially extended position.
Figure 6:
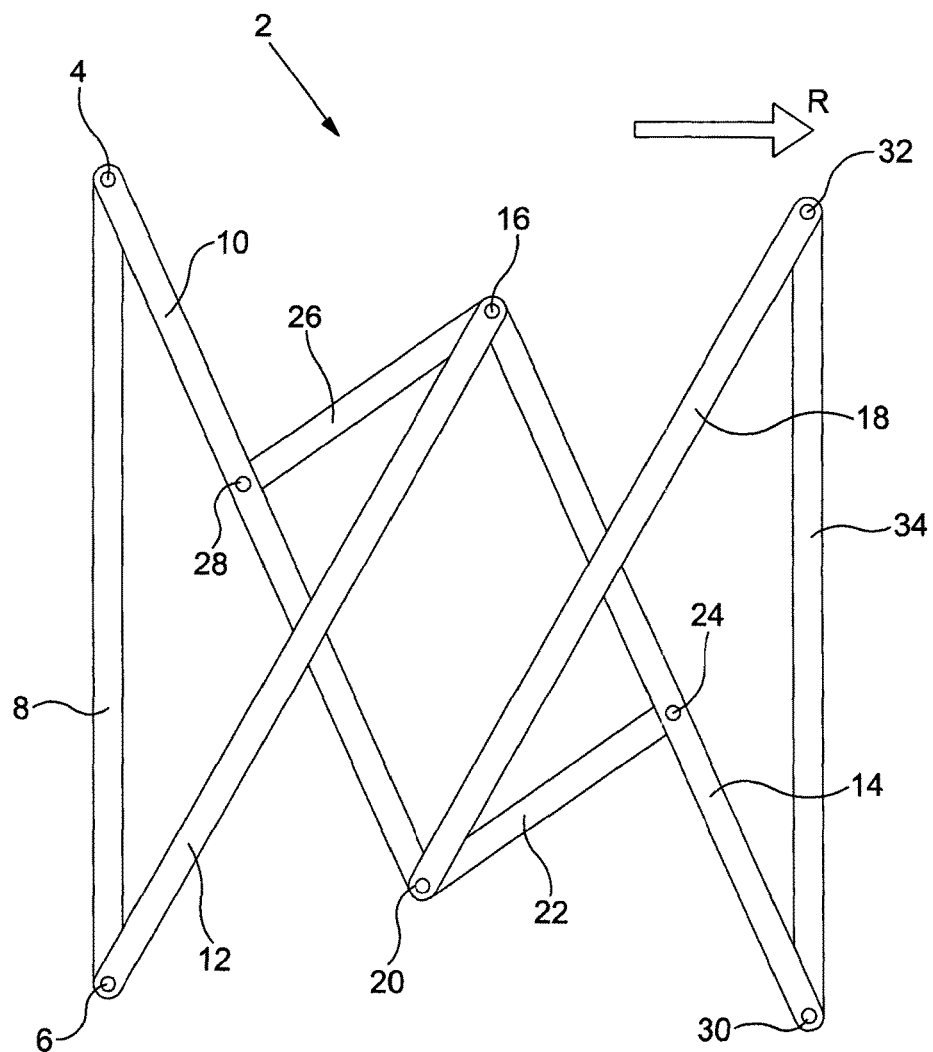
FIG. 6 is a diagrammatical representation of the assembly of FIG. 1 in a third partially extended position.

Turning now to FIGS. 3 to 6, there is shown a sequence of drawings of the assembly of FIG. 1 in positions between a retracted position, shown in FIG. 3, and a partially extended position shown in FIG. 6.

Referring to FIG. 3, the assembly 2 is shown in a retracted position.

The arms of the assembly are formed to lie within one another when in the retracted position of FIG. 3. In this way, the assembly 2 occupies the minimum amount of space when in the retracted position.

The assembly 2 is shown in FIG. 4 in a first partially extended position, with the third and fourth arms 14, 18 having moved away from the fixed pivots 4, 6 in the direction indicated by arrow R. In the movement from the position of FIG. 3 to the position of FIG. 4, the point A at the end of the third arm 14 and the point H at the end of the fourth arm are following a substantially straight line.

FIG. 5 shows the assembly 2 in a second partially extended position, with the third and fourth arms 14, 18 moved further away from the fixed pivots 4, 6. Again, points A and H on the third and fourth arms 14, 18 are tracing a substantially straight line from their position in the retracted position of FIG. 3.

Similarly, FIG. 6 shows the assembly 2 in a third partially extended position, with the third and fourth arms 14, 18 still further from the fixed pivots 4, 6 and the points A and H each still following a straight line path.

Figure 7:
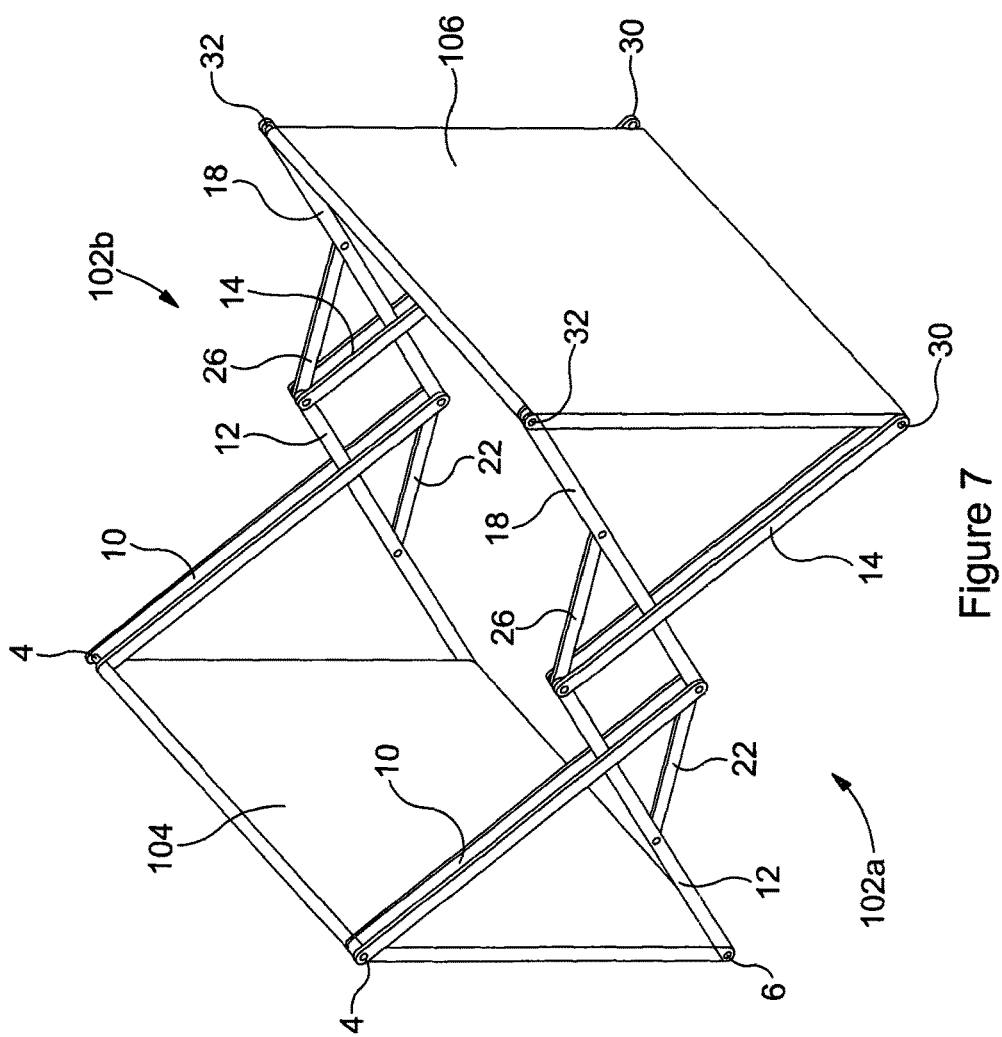
FIG. 7 is a perspective view of a building assembly comprising two panels interconnected by two assemblies of FIG. 1.

Further movement of the assembly from the position shown in FIG. 7 brings the assembly to the extended position shown in FIGS. 1 and 2.

Referring now to FIG. 7, there is shown a pair of conjoined assemblies of the general arrangement of the assembly of FIGS. 1 and 2. The assemblies, generally indicated as 102a and 102b, have the general configuration of the assembly shown in FIG. 1 and components of the assemblies are indicated using the reference numerals used in FIG. 1. The assemblies 102a, 102b are arranged in a parallel orientation and mounted to opposing sides of a generally rectangular, vertical panel 104. In particular, the first and second arms 10, 12 of each assembly 102a, 102b are pivotally connected to respective vertical sides of the panel 104.

The assemblies 102a, 102b are further connected to and support a second panel 106. The second panel 106 is movable with respect to the panel 104. The third and fourth arms 14, 18 of each assembly 102a, 102b are pivotally connected to respective vertical sides of the second panel 106.

It will be understood that the panels 104, 106 are examples only of components that may be interconnected and moved by way of the assemblies 102a, 102b. It is to be further understood that additional assemblies may be provided, as required to move and support one component with respect to the other.

As noted above, it has been found that the assembly of the present invention may be combined with one or more further assemblies to provide a straight line motion, without deviation. In particular, the assembly of the present invention can be combined in an end-to-end configuration either with one or more further assemblies of the present invention and/or with an assembly as described and shown in GB 1209982.6.

Figure 8:
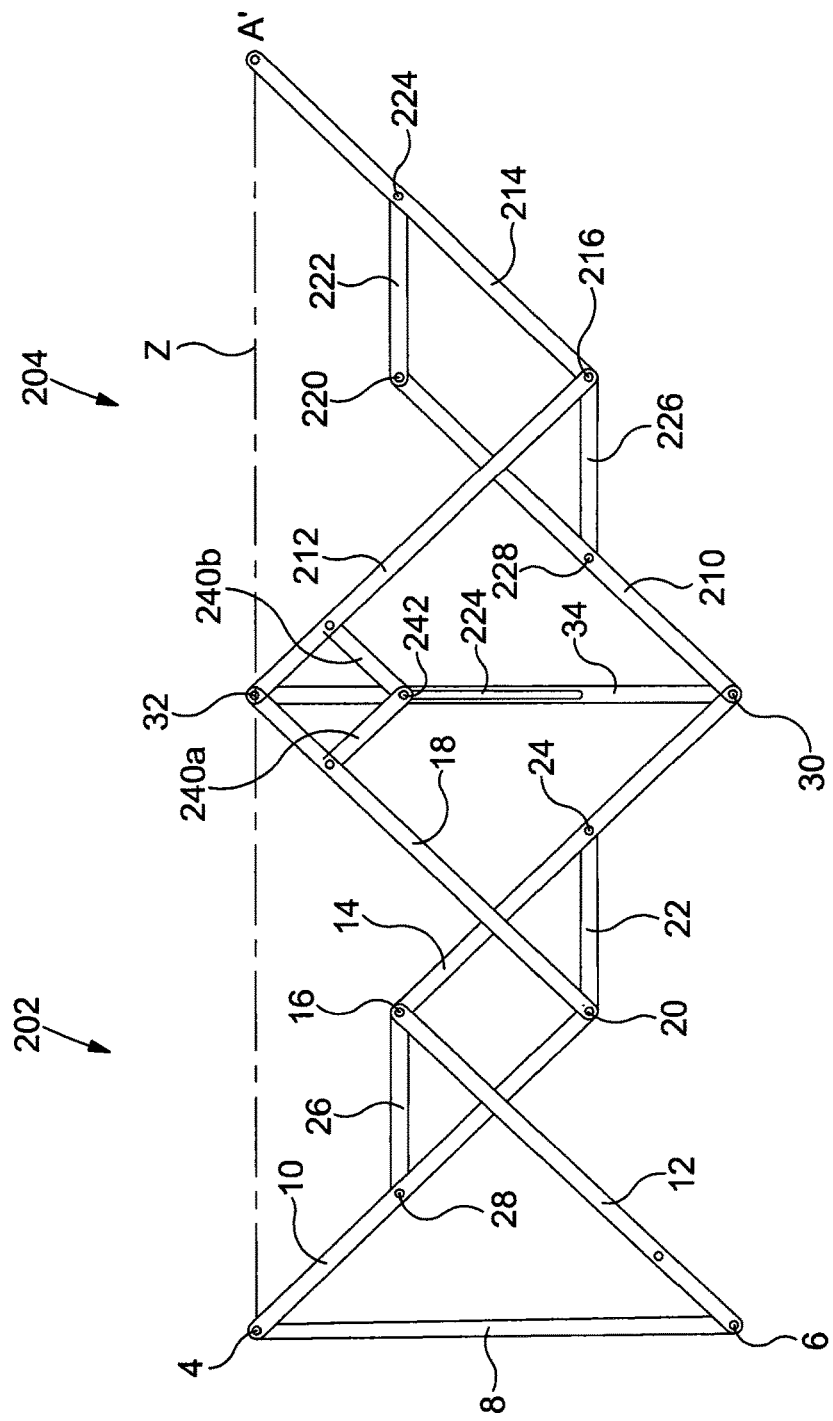
FIG. 8 is a side representation of a moveable structure comprising an assembly of FIG. 1 and an assembly of GB1209982.6 arranged in end-to-end relationship.

Turning to FIG. 8, there is shown a side view of a moveable structure comprising a first assembly 202 and a second assembly 204. The first assembly 202 has the generally configuration of the assembly of FIG. 1 and the components of the assembly are labelled using the same reference numerals. The first assembly 202 is mounted to a support arm 8 providing the fixed location of the fixed pivots 4, 6, the components of the first and second assemblies moving relative to the support arm 8 and the fixed pivots 4, 6.

The second assembly 204 is an assembly of GB 1209982.6. The second assembly 204 has the following configuration:

A first arm 210 is pivotally connected at one end to the pivoted connection 30 of the first assembly, forming the first fixed pivot for the second assembly 204. A second arm 212 is pivotally connected at one end to the pivoted connection 32, forming the second fixed pivot for the second assembly 204. It will be noted that the first and second fixed pivots for the second assembly 204 are inverted with respect to the first and second fixed pivots 4, 6 of the first assembly 202.

A third arm 214 is mounted at one end by a pivot connection 216 at the second end of the second arm 212.

A first connecting arm 222 is mounted at one end by the pivot connection 220 at the second end of the first arm 210. The second end of the first connecting arm 222 is mounted by a pivot connection 224 to the third arm 214, at a position on the third arm spaced from the pivot connection 216.

A second connecting arm 226 is mounted at one end by a pivot connection 228 to the first arm 210 at a position spaced from both the pivot 30 and the pivot 220. The second end of the second connecting arm 226 is mounted by the pivot connection 216 to both the second arm 212 and the third arm 214.

The pivot connections may be formed by any suitable means, for example by pins extending through holes in the arms being pivotally joined.

Movement of the first arm 210 about the pivot 30 and the second arm 212 about the pivot 32 causes the third arm 214 to move such that the point A' on the third arm moves between a retracted position and an extended position. With both assemblies 202, 204 moving between the retracted position and the extended position, the point A' on the third arm 214 describes a straight line with no deviation therefrom, indicated by the line Z.

The structure shown in FIG. 8 further comprises bracing arms 240a, 240b pivotally connected at a first end to the fourth arm 18 of the first assembly 202 and the second arm 212 of the second assembly 204, respectively. The bracing arms 240a, 240b are joined by a pivot connection 242 at their second ends. The pivot connection 242 is slidable along an elongate slot 244 in the support arm 34. A force to drive the entire structure between its retracted and extended positions may be applied to the pivot connection 242.

Figure 9:
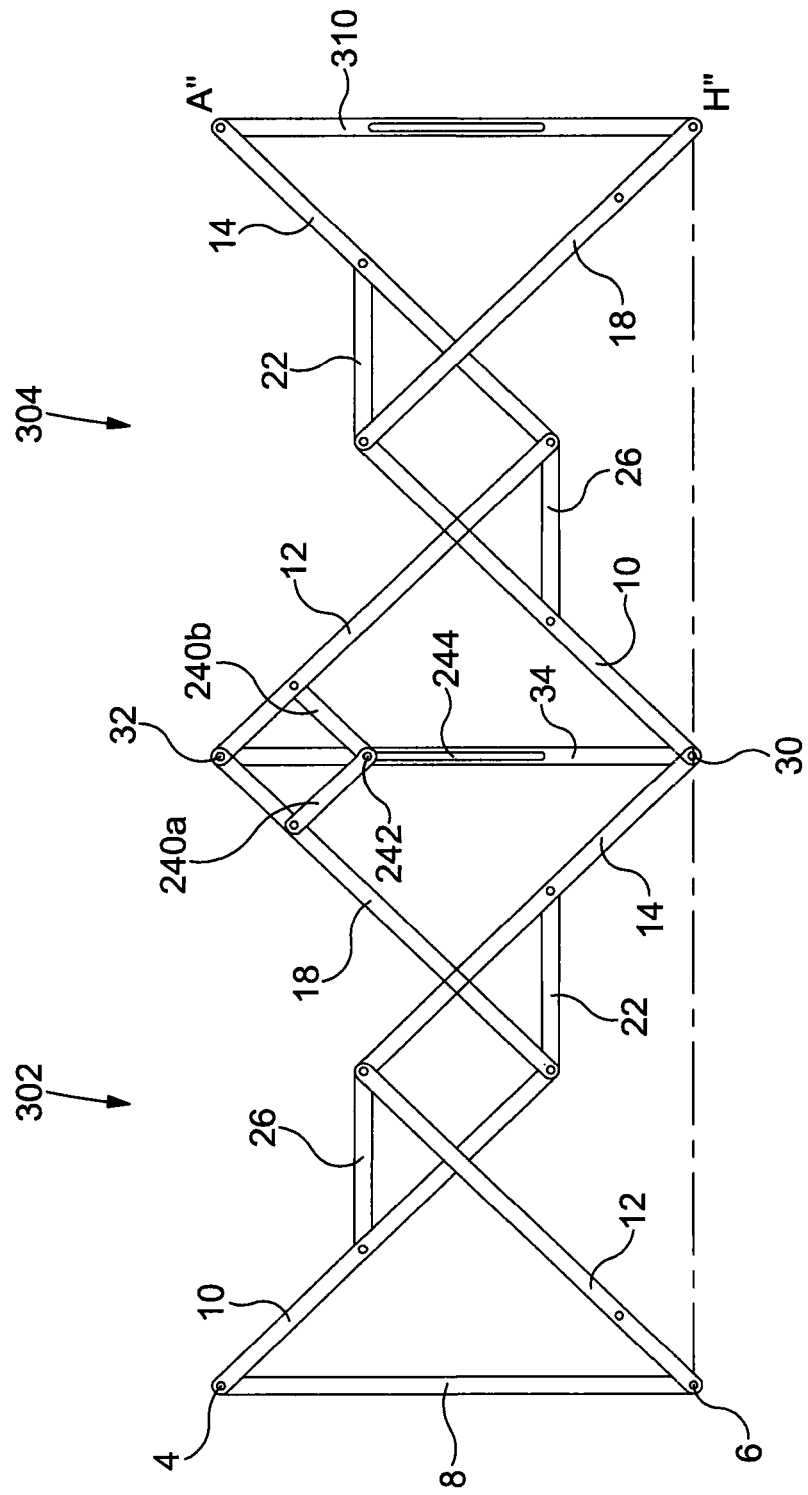
FIG. 9 is a side representation of a moveable structure comprising two assemblies of FIG. 1 arranged in an end-to-end relationship.

FIG. 9 shows a structure comprising a first assembly 302 and a second assembly 304. Both assemblies 302, 304 are of the arrangement shown in FIGS. 1 and 2 and described above. The assemblies 302, 304 are connected in an end-to-end relationship analogous to that of the assemblies of FIG. 8, with a similar arrangement of bracing arms. Thus, the pivot connection 30 provides the first fixed pivot for the second assembly 304 and the pivot connection 32 provides the second fixed pivot for the second assembly 304. The second assembly 304 is inverted with respect to the first assembly 302.

The third and fourth arms 14, 18 of the second assembly 304 are connected at their distal ends to a component to be moved. In the structure of FIG. 9, the component is a support arm 310. It is to be understood that other components may be connected to the third and fourth arms, as required.

The points A" and H" on the third and fourth arms 14, 18 respectively of the second assembly 304 move in a precise straight line with respect to the fixed pivots 4, 6, more particularly perpendicular to the line joining the fixed pivots 4, 6.

The structure of FIG. 9 as shown consists of two assemblies 302, 304 interconnected. It will be understood that the structure may comprise one or more further assemblies connected in an analogous end-to-end relationship to that shown in FIGS. 8 and 9. When the total number of assemblies is an even number, the distal or endmost moveable arms will have a point thereon that follows a precise straight line relative to the fixed pivots 4, 6, in particular a line extending perpendicular to the line joining the fixed pivots.

Figure 10:
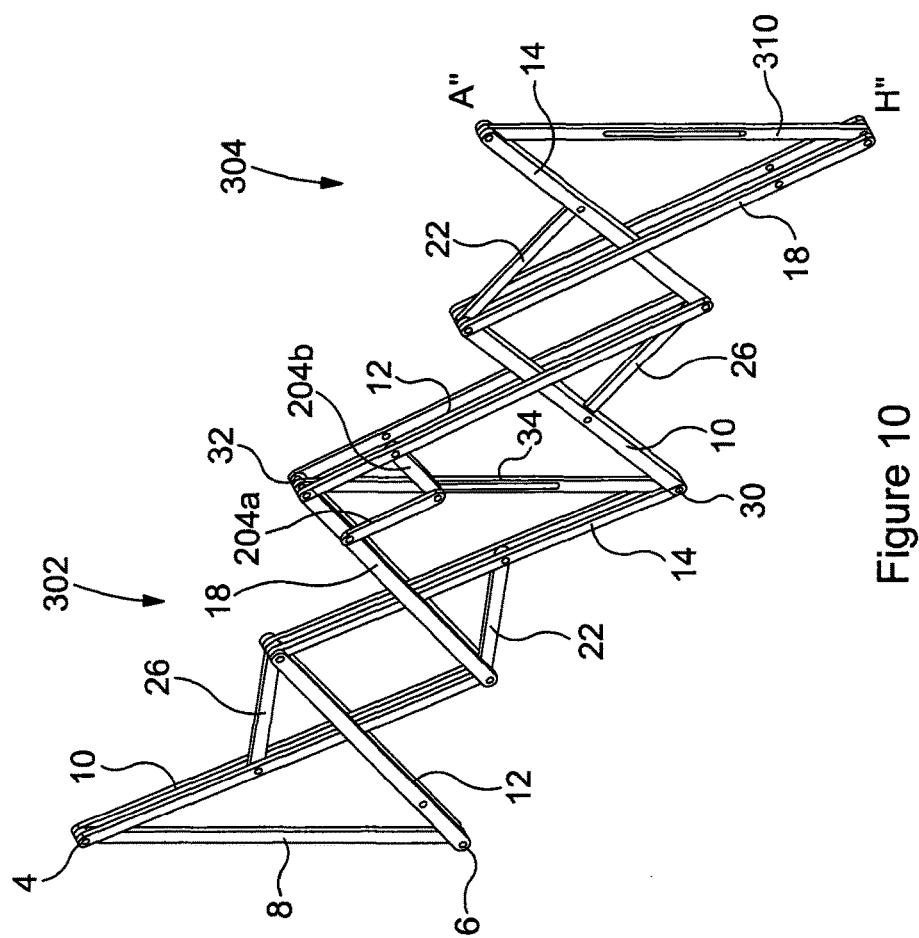
FIG. 10 is a perspective view of the structure of FIG. 9 in an extended position.

The structure of FIG. 9 is shown in a perspective view in its extended position in FIG. 10.

Figure 11:
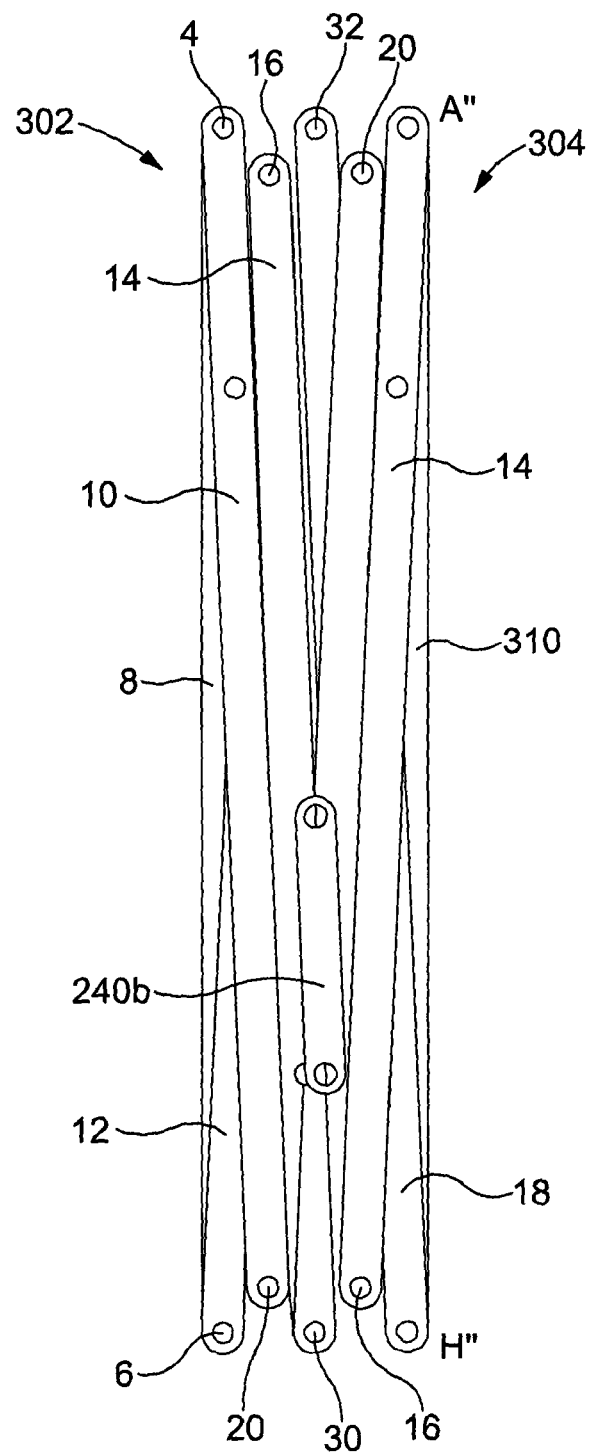
FIG. 11 is a diagrammatical side representation of the assembly of FIG. 9 in a retracted position.
Figure 12:
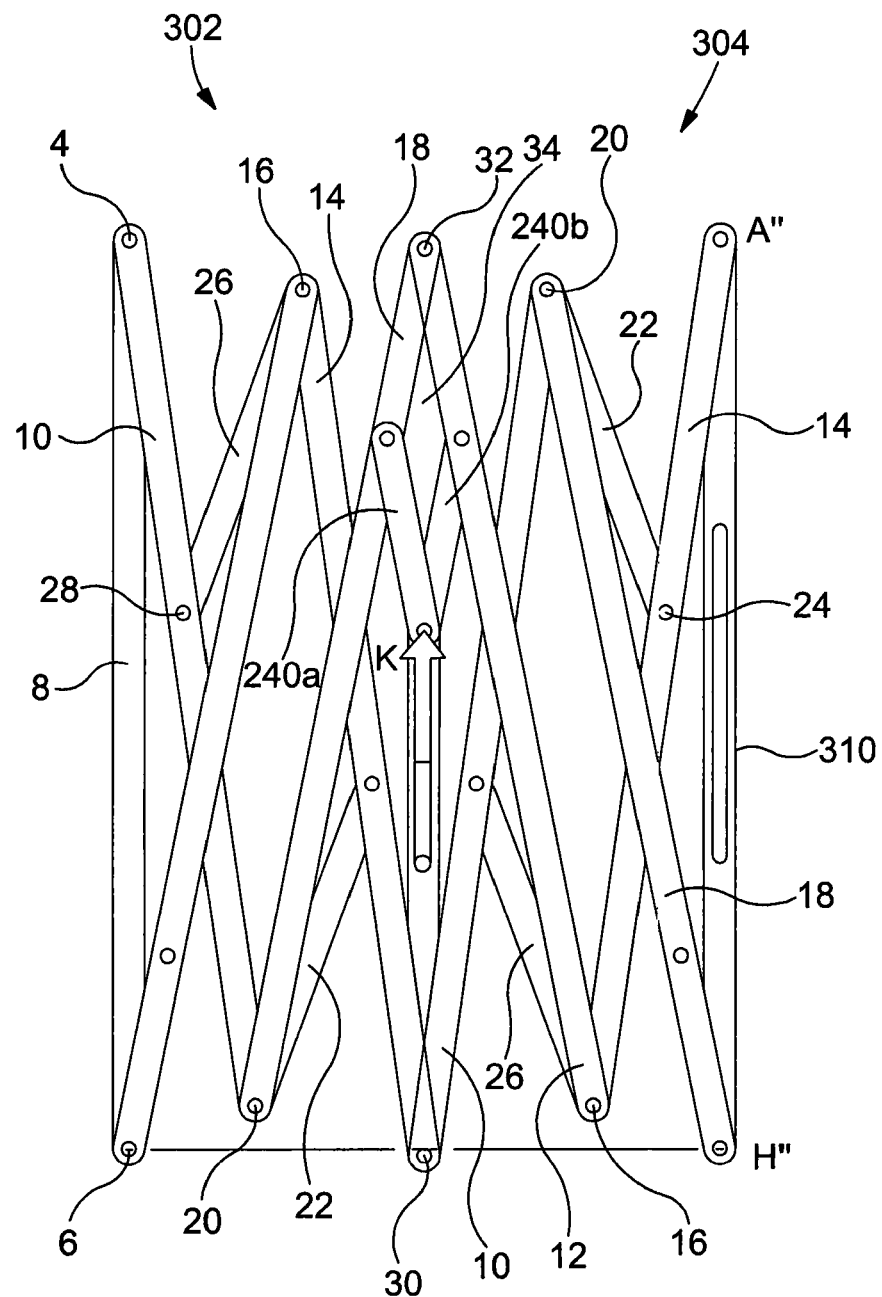
FIG. 12 is a diagrammatical side representation of the assembly of FIG. 9 in a first partially extended position.
Figure 13:
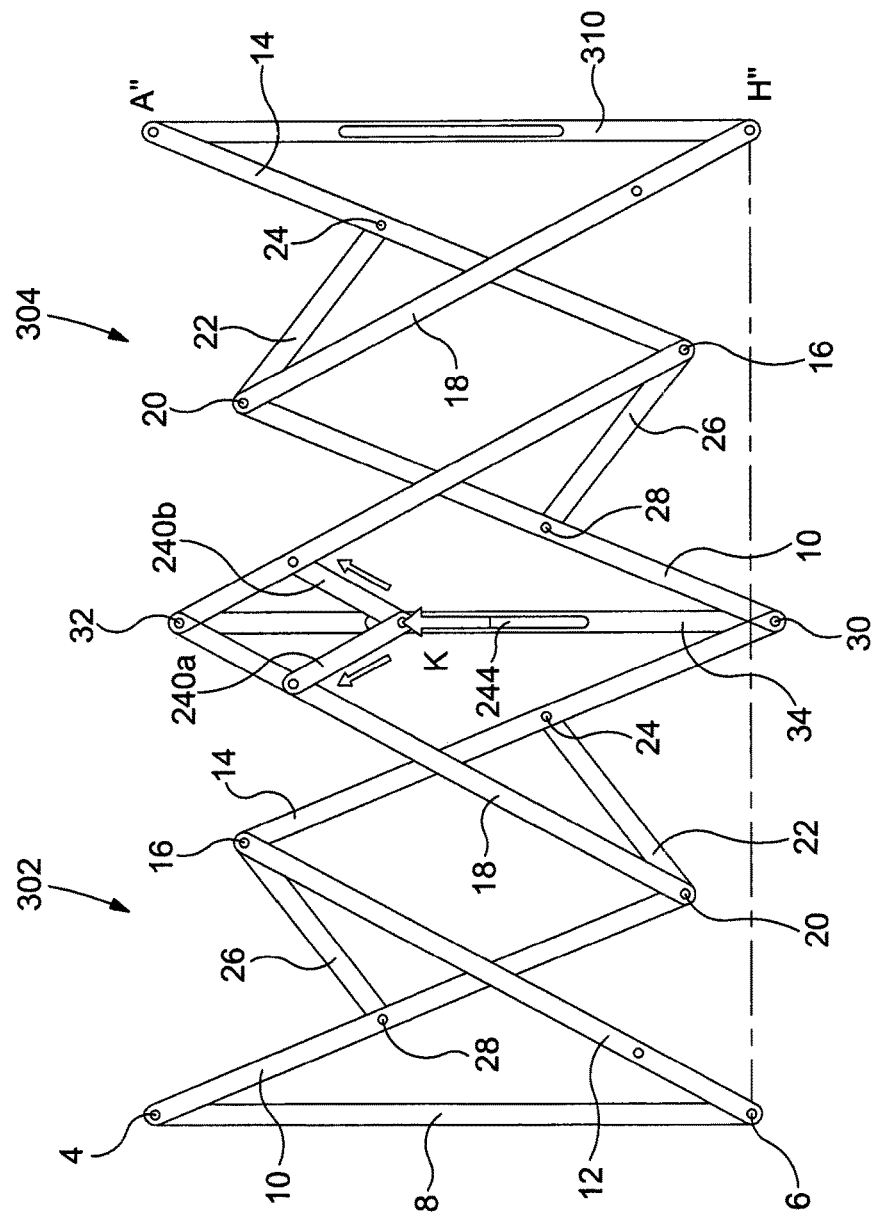
FIG. 13 is a diagrammatical side representation of the assembly of FIG. 9 in a second partially extended position

FIG. 11 shows the structure of FIGS. 9 and 10 in a retracted position. The movement of the structure from the retracted position of FIG. 11 to the extended position of FIGS. 9 and 10 is shown in FIGS. 12 and 13.

In the arrangement shown, drive is applied to the structure at the pivot connection 242 of the bracing arms 240a, 240b, for example by way of a jack or other linear drive means. Drive may be applied to other components of the structure, for example rotational drive applied to one or both of the first and second arms 10, 12. The direction of the force applied to move the structure from the retracted to the extended position is indicated by the arrows K. Force applied in the reverse direction retracts the structure from the extended position.

Figure 14:
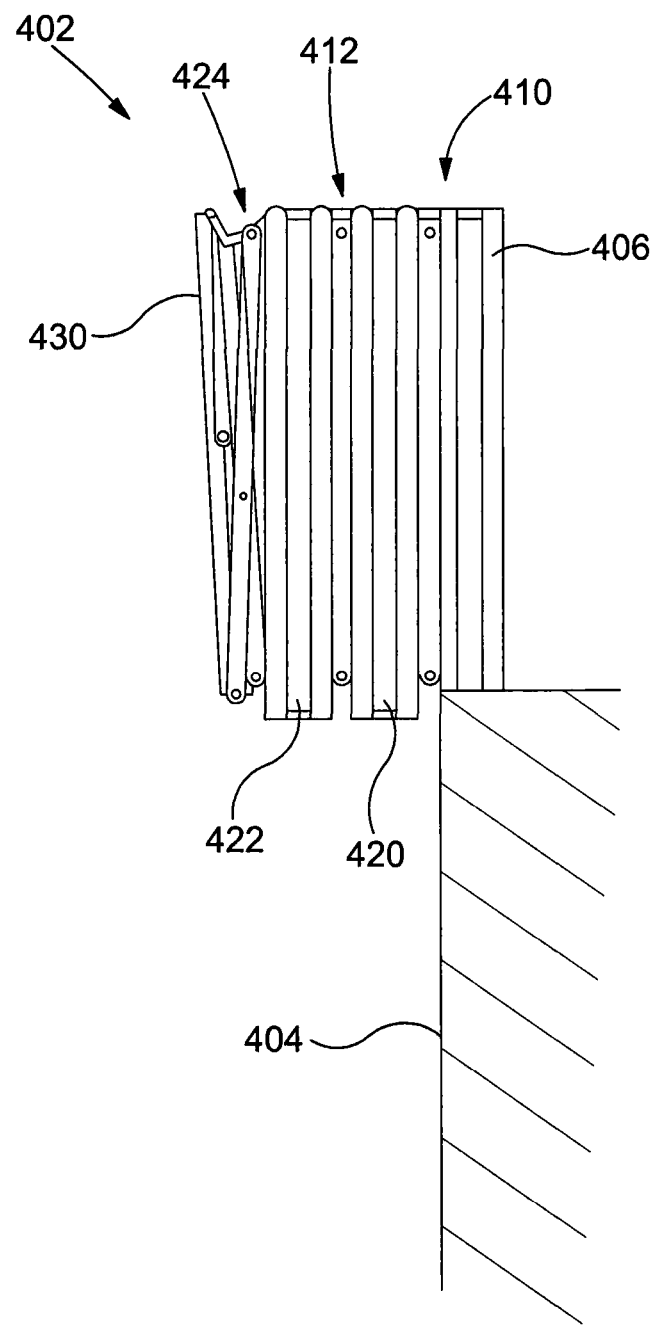
FIG. 14 is a side view of a bridge assembly incorporating a plurality of assemblies of the present invention in a retracted position.
Figure 15:
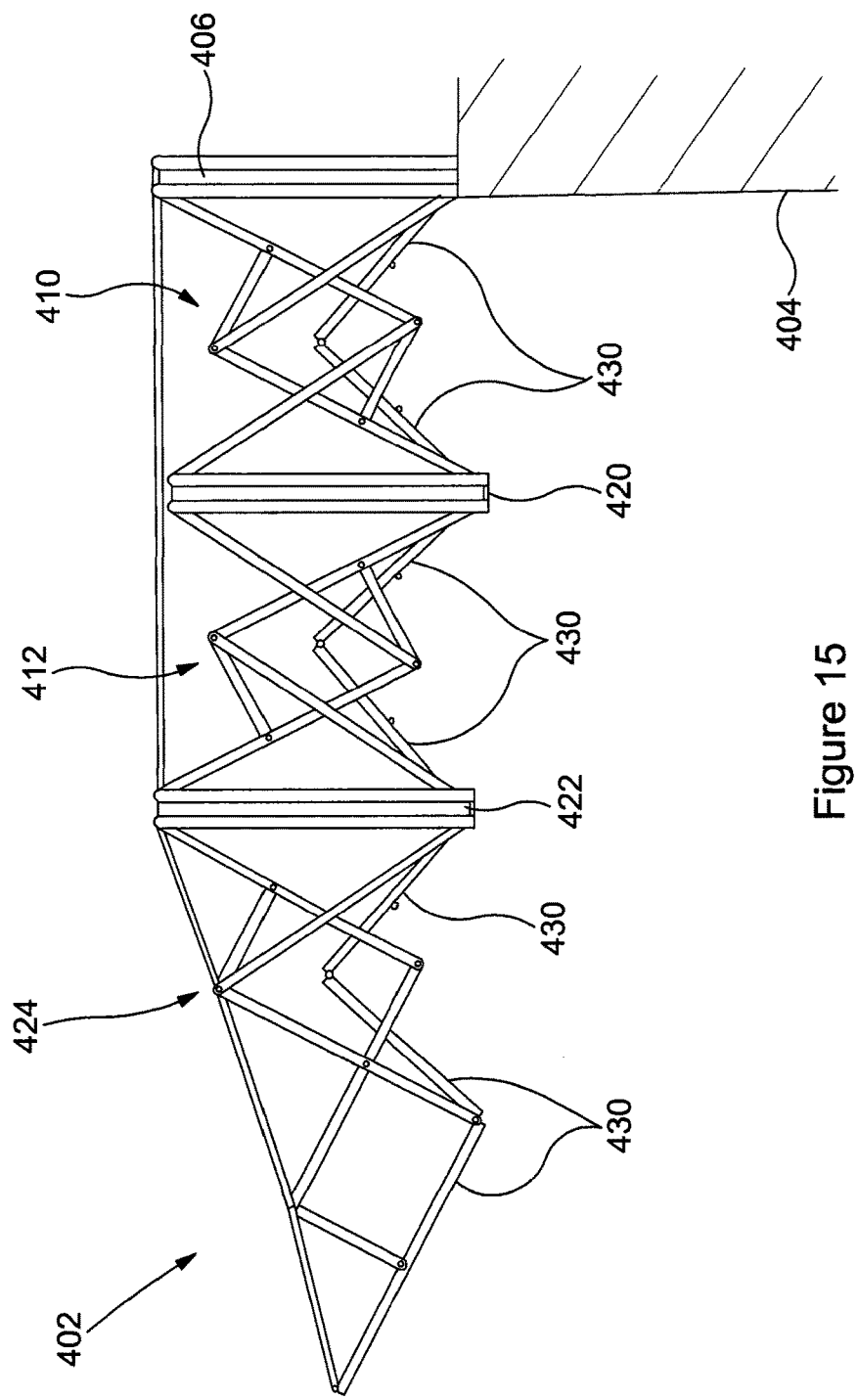
FIG. 15 is a side view of the bridge assembly of FIG. 14 in a partially extended position.
Figure 16:
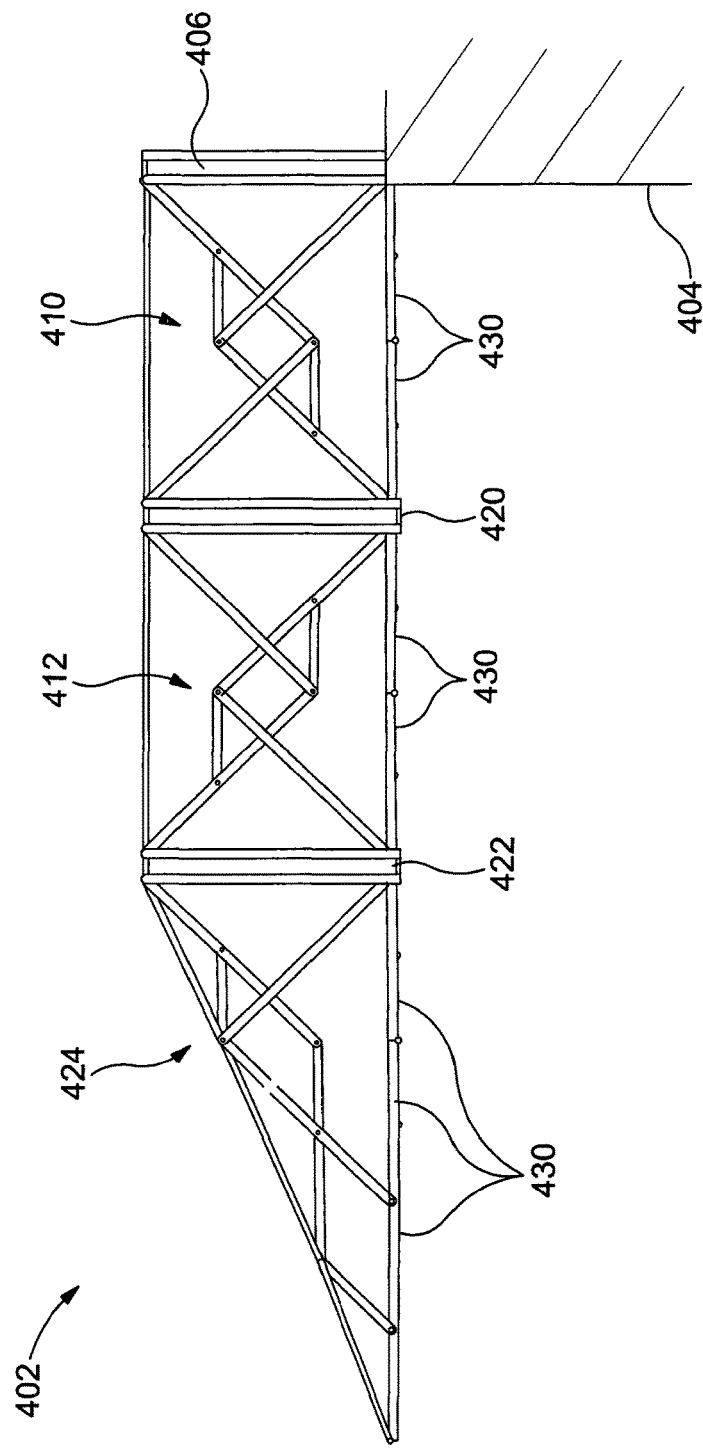
FIG. 16 is a side view of the bridge assembly of FIG. 14 in an extended position.

Turning to FIGS. 14 to 17, there is shown a bridge assembly comprising a plurality of assemblies of the present invention. The bridge assembly, generally indicated as 402, is shown mounted on fixed structure 404 by means of a fixed vertical support member 406. The bridge assembly 402 comprises a first assembly 410 and a second assembly 412, both of the form shown in FIG. 1 and described above. The first assembly 410 has its first and second arms connected to fixed pivots mounted on the fixed vertical support member 406. A first moveable vertical support member 420 is connected to the third and fourth arms of the first assembly 410. The second assembly 412 has its first and second arms connected to pivots mounted to the first moveable vertical support member 420. A second moveable vertical support member 422 is connected to the third and fourth arms of the second assembly 412. As shown in FIGS. 14 and 15, the second assembly 412 is inverted with respect to the first assembly 410.

The bridge assembly 402 further comprises an assembly of GB 1209982.6, indicated as 424, having its first and second arms pivotally connected to the second moveable vertical support member 422.

A plurality of decking members 430 are hingedly connected together and pivotally connected to the vertical support members 406, 420, 422. A decking member 430 is connected to each of the third arm of the first assembly 410, the fourth arm of the second assembly 412 and the third arm of the assembly of GB 1209982.6 424, as shown in FIGS. 14 and 15. A further decking member 430 is pivotally connected to the third arm of the assembly of GB 1209982.6 424.

Figure 17:
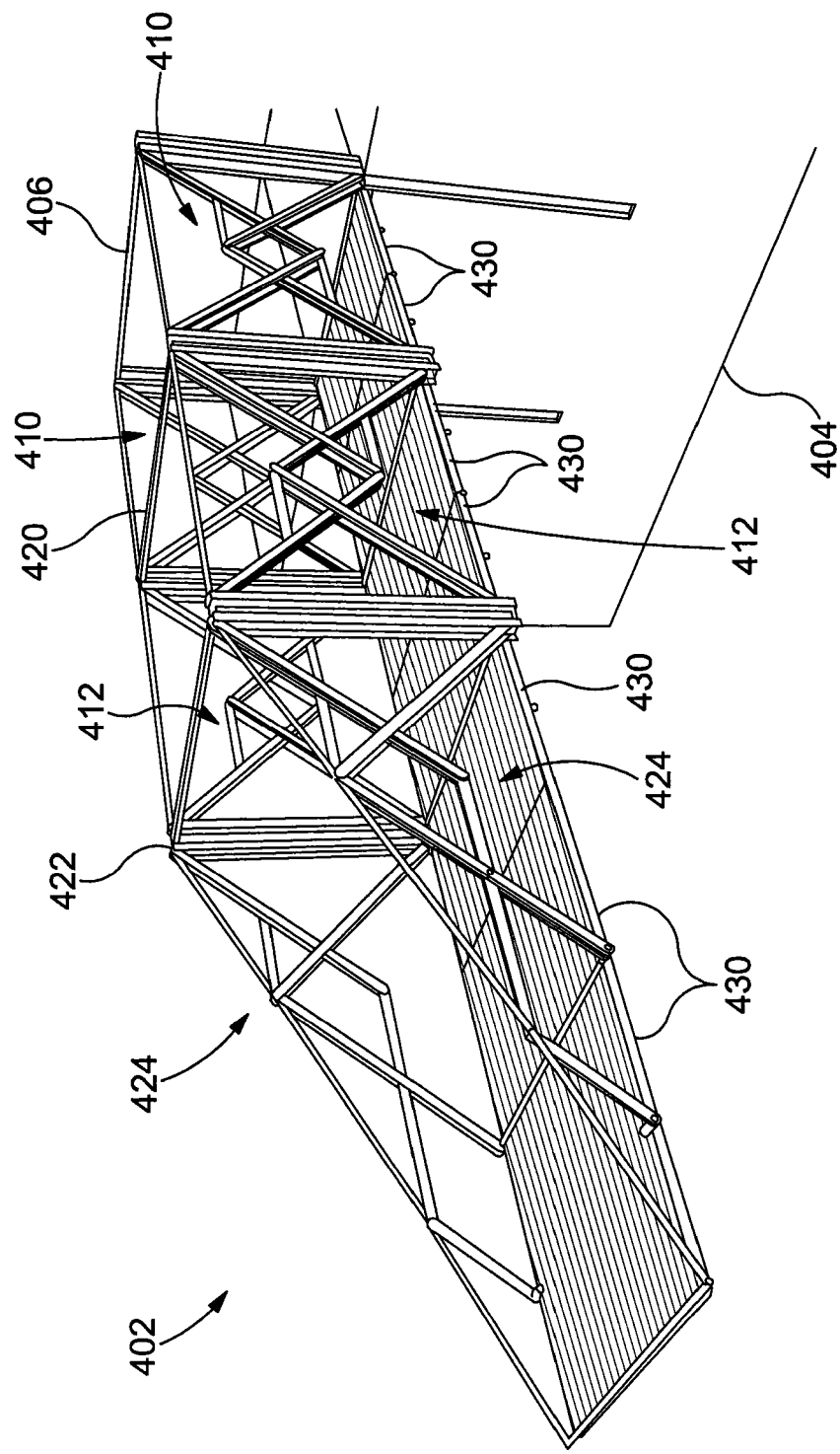
FIG. 17 is a perspective view of the bridge assembly in the extended position of FIG. 16

The bridge assembly 402 is shown in the extended position in a perspective view in FIG. 17. As can be seen, the assemblies 410, 412, 424 are arranged in pairs on either side of the vertical support members 406, 420, 422 and the decking members 430.

Figure 18:
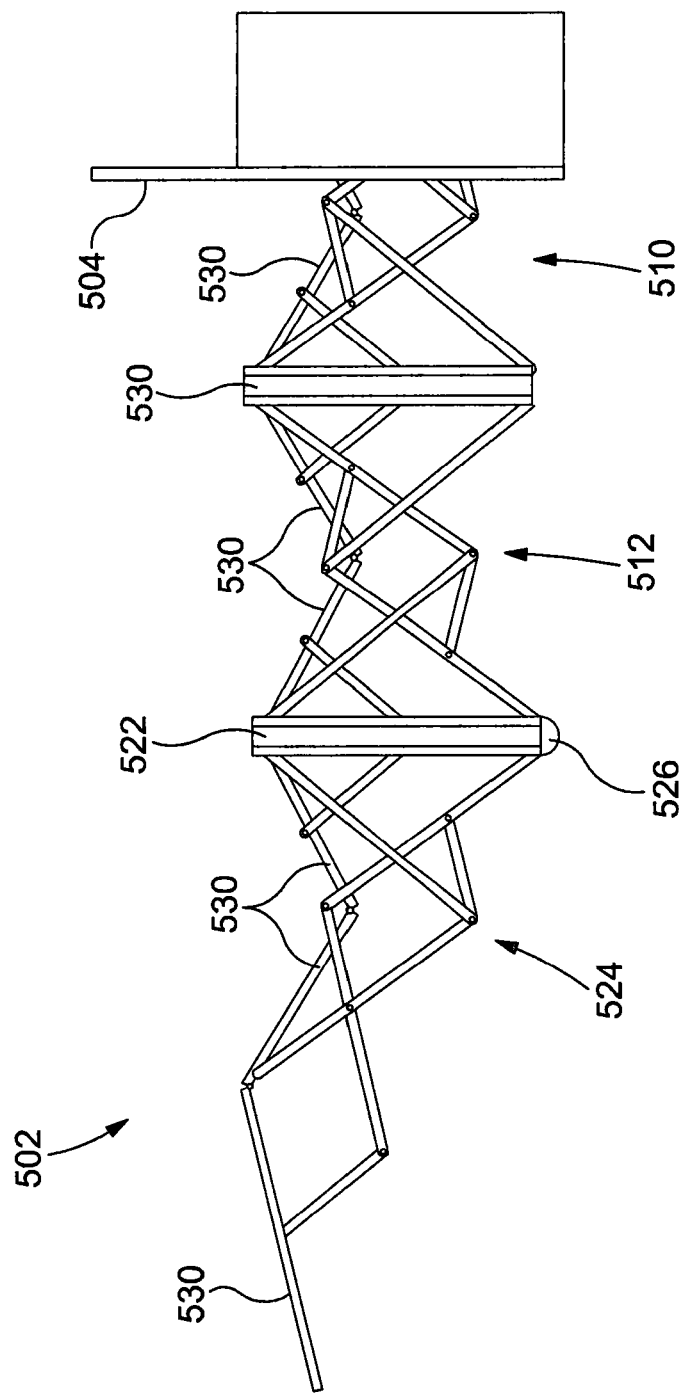
FIG. 18 is a side view of an extendable roof assembly incorporating a plurality of assemblies of the present invention in a partially extended position.
Figure 19:
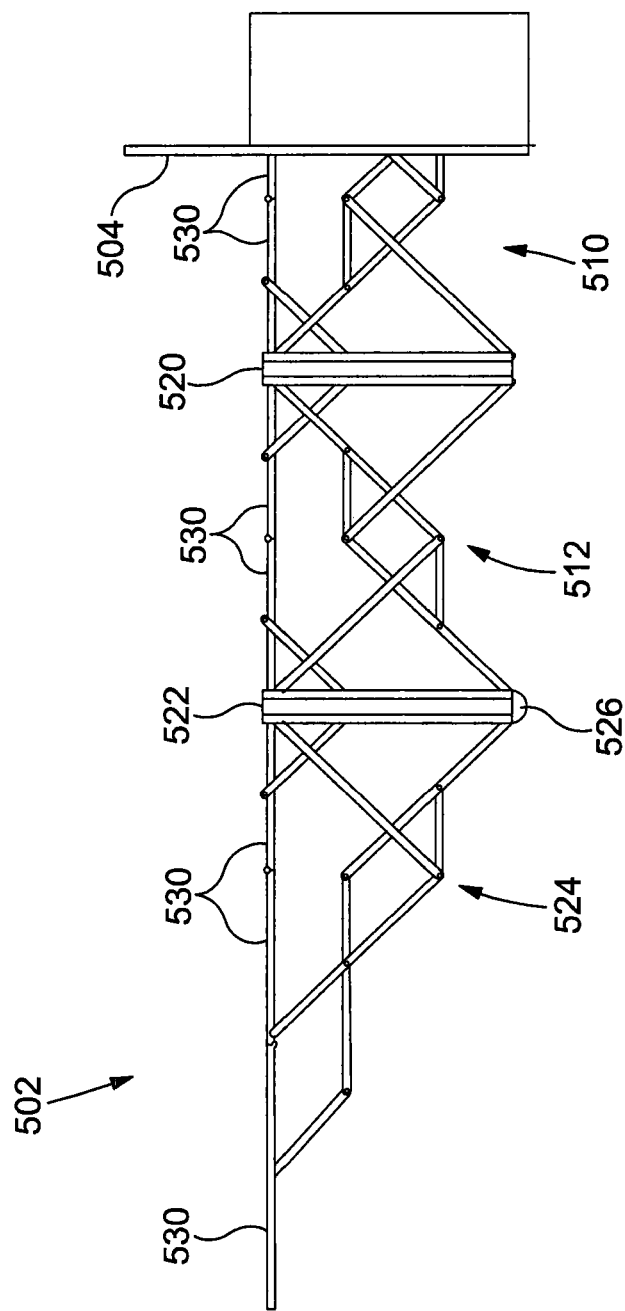
FIG. 19 is a side view of the roof assembly of FIG. 18 in an extended position.
Figure 20:
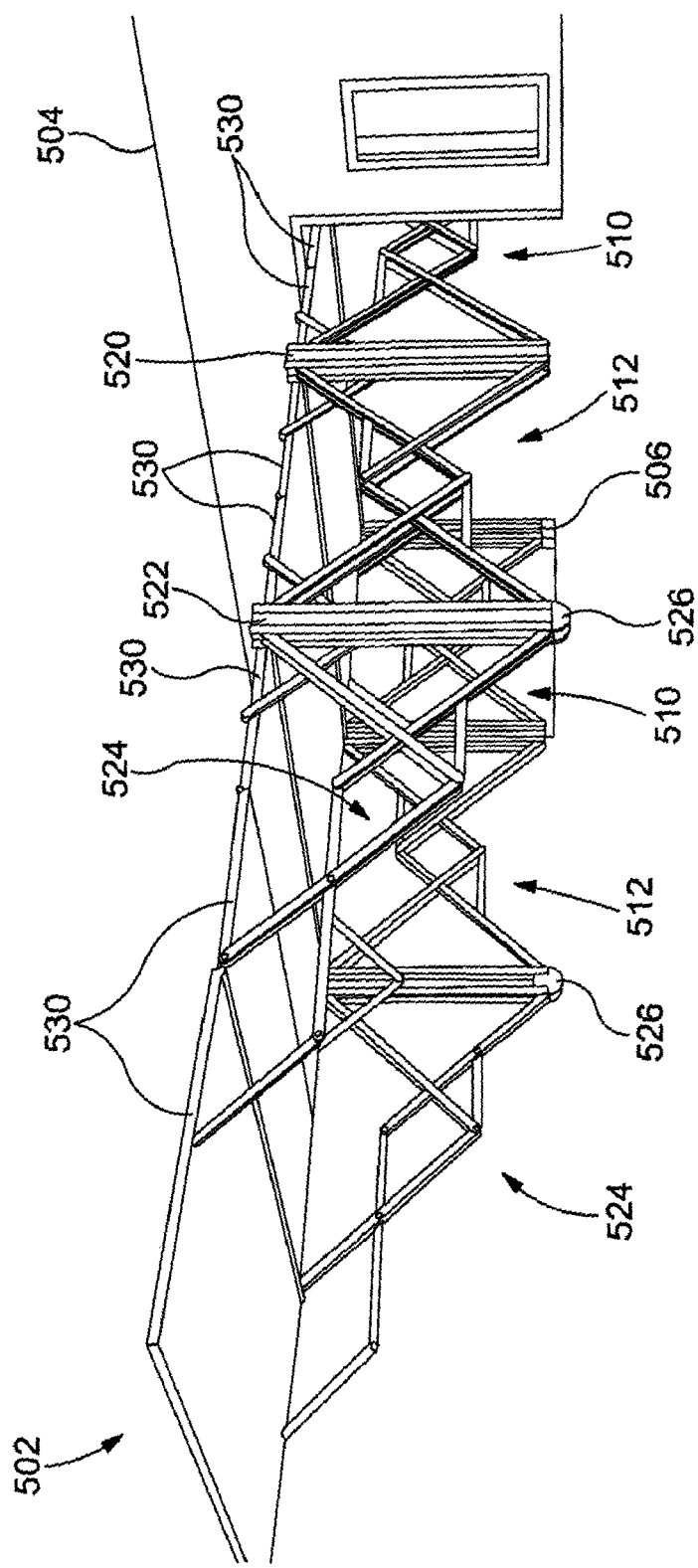
FIG. 20 is a perspective view of the roof assembly in the extended position of FIG. 19.

Turning now to FIGS. 18 to 20, there is shown an expandable roof assembly comprising a plurality of assemblies of the present invention. The roof assembly, generally indicated as 502, is mounted at an opening in a wall of a building 504 by means of a fixed vertical support member 506. The roof assembly is arranged in an analogous manner to the bridge assembly of FIGS. 14 to 17. Thus, the roof assembly 502 comprises a first assembly 510 and a second assembly 512, both of the form shown in FIG. 1 and described above. The first assembly 510 has its first and second arms connected to fixed pivots mounted on the fixed vertical support member 506. A first moveable vertical support member 520 is connected to the third and fourth arms of the first assembly 510. The second assembly 512 has its first and second arms connected to pivots mounted to the first moveable vertical support member 520. A second moveable vertical support member 522 is connected to the third and fourth arms of the second assembly 512. As shown in FIGS. 18 and 19, the second assembly 512 is inverted with respect to the first assembly 510.

The roof assembly 502 further comprises an assembly of GB 1209982.6, indicated as 524, having its first and second arms pivotally connected to the second moveable vertical support member 522.

Wheels 526 are provided on the lower end of the second support member 522, for contacting and moving along the ground.

A plurality of roof members 530 are hingedly connected together and pivotally connected to the vertical support members 506, 520, 522. A roof member 530 is connected to each of the fourth arm of the first assembly 510, the third arm of the second assembly 512 and the third arm of the assembly of GB 1209982.6 424, as shown in FIGS. 18 and 19. A further roof member 530 is pivotally connected to the third arm of the assembly of GB 1209982.6 524.

The roof assembly 502 is shown in the extended position in a perspective view in FIG. 20. As can be seen, the assemblies 510, 512, 524 are arranged in pairs on either side of the vertical support members 506, 520, 522 and the roof members 530.

Figure 21:
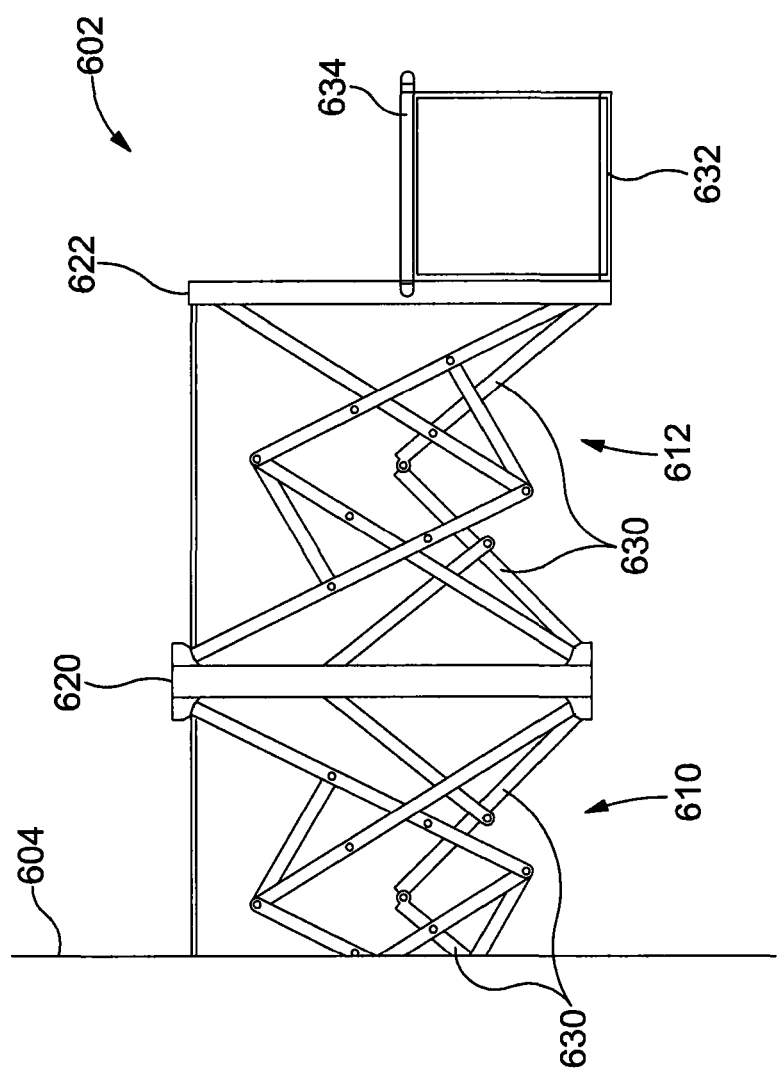
FIG. 21 is a side view of an extendable gantry assembly incorporating a plurality of assemblies of the present invention in a partially extended position.
Figure 22:
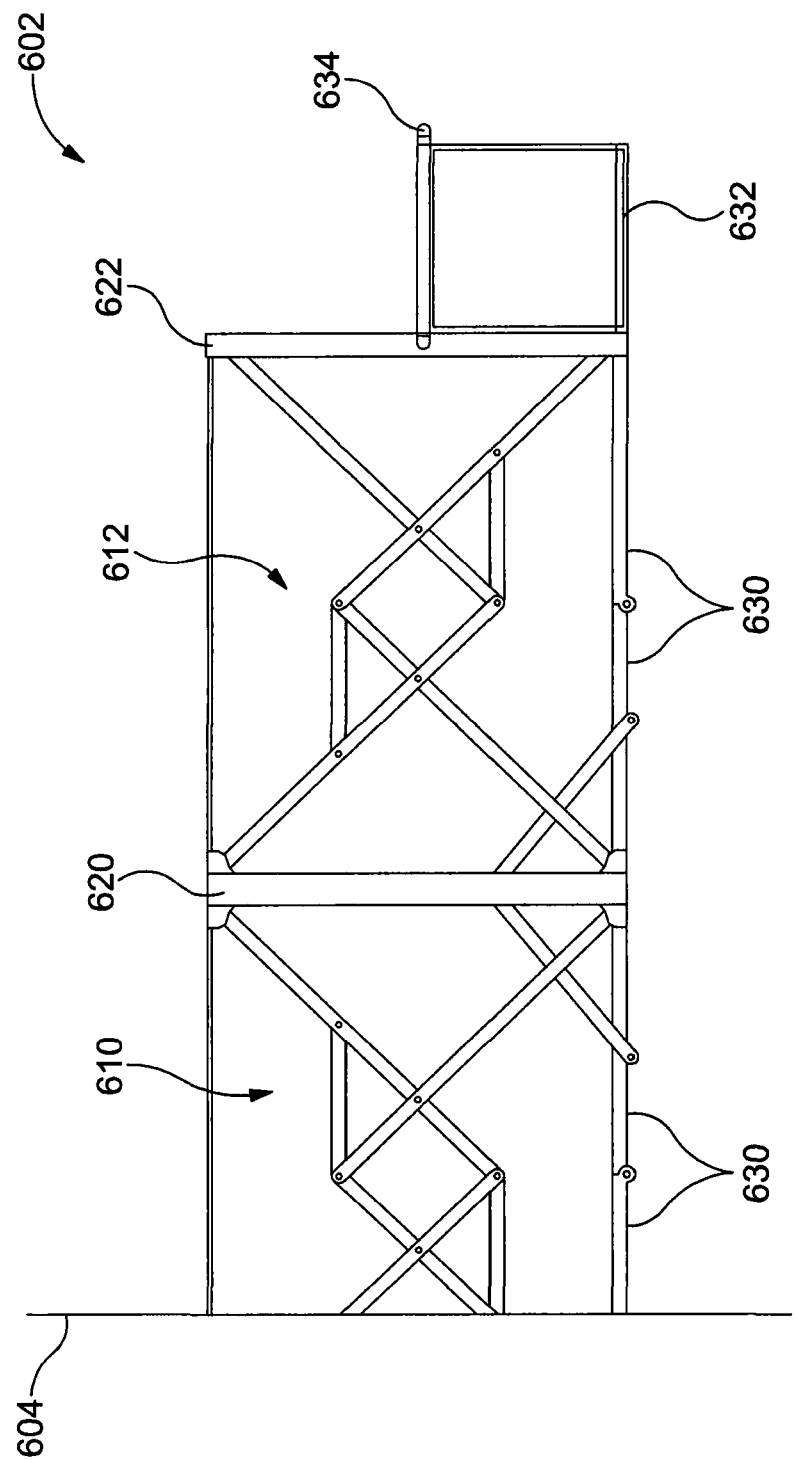
FIG. 22 is a side view of the gantry assembly of FIG. 21 in an extended position.
Figure 23:
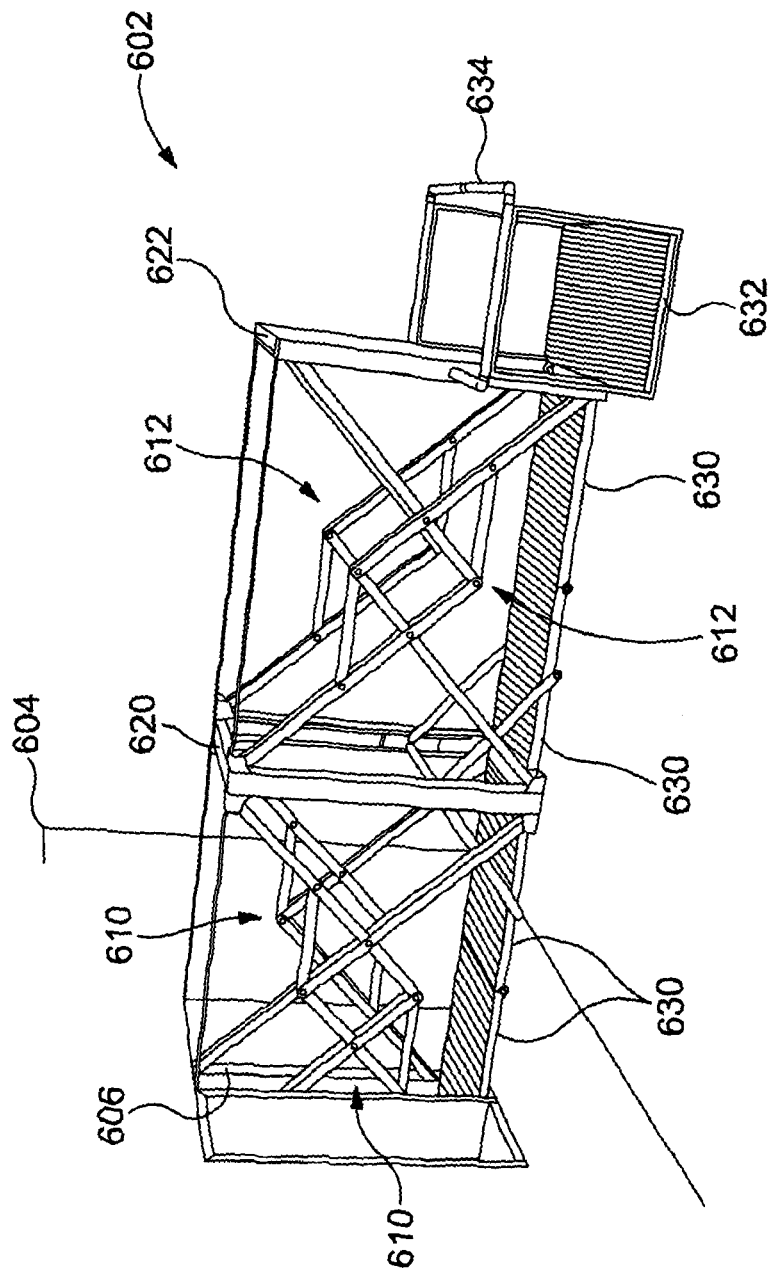
FIG. 23 is a perspective view of the gantry assembly in the extended position of FIG. 22.

Referring now to FIGS. 21 to 23, there is shown an expandable gantry assembly comprising a plurality of assemblies of the present invention. The gantry assembly, generally indicated as 602, is mounted at an opening in a wall of a building 604 by means of a fixed vertical support member 606. The gantry assembly is arranged in an analogous manner to the bridge assembly of FIGS. 14 to 17. Thus, the gantry assembly 602 comprises a first assembly 610 and a second assembly 612, both of the form shown in FIG. 1 and described above. The first assembly 610 has its first and second arms connected to fixed pivots mounted on the fixed vertical support member 606. A first moveable vertical support member 620 is connected to the third and fourth arms of the first assembly 610. The second assembly 612 has its first and second arms connected to pivots mounted to the first moveable vertical support member 620. A second moveable vertical support member 622 is connected to the third and fourth arms of the second assembly 612. As shown in FIGS. 21 and 22, the second assembly 612 is inverted with respect to the first assembly 610.

A plurality of gantry members 630 are hingedly connected together and pivotally connected to the vertical support members 606, 620, 622. A gantry member 630 is connected to each of the fourth arm of the first assembly 610, the third arm of the second assembly 612, as shown in FIGS. 18 and 19.

A platform 632 having a railing 634 is mounted to the second vertical support member 622, with the platform 632 in line with the gantry members 630, when in the extended position shown in FIGS. 22 and 23.

The gantry assembly 602 is shown in the extended position in a perspective view in FIG. 23. As can be seen, the assemblies 610, 612, 624 are arranged in pairs on either side of the vertical support members 606, 620, 622 and the gantry members 630.

The invention claimed is:

1. An assembly for converting motion, the assembly being moveable between a retracted position and an extended position, the assembly comprising:
   a first arm rotatable at a first position on the first arm about a first fixed pivot;
   a second arm rotatable at a first position on the second arm about a second fixed pivot, the second fixed pivot spaced apart from the first fixed pivot, wherein the first fixed pivot is fixed in relation to the second fixed pivot;
   a third arm pivotably connected at a first position on the third arm to the second arm at a second position on the second arm, the second position on the second arm spaced apart from the first position on the second arm;
   a fourth arm pivotably connected at a first position on the fourth arm to the first arm at a second position on the first arm, the second position on the first arm spaced apart from the first position on the first arm;
   a first connecting arm extending between the first arm and the third arm, the first connecting arm pivotably connected to a third position on the first arm spaced apart from the first position on the first arm, the first connecting arm pivotably connected to the third arm at a second position ton the third arm spaced apart from the first position on the third arm; and
   a second connecting arm extending between the first arm and the second arm, the second connecting arm pivotably connected to a fourth position on the first arm disposed between the first and second positions on the first arm and pivotably connected to a third position on the second arm;
   the third arm being adapted to connect at a third position on the third arm to a first position on a component to be moved relative to the first and second fixed pivots, wherein the third arm comprises a point on the third arm, the said point on the third arm spaced from the first position on the third arm and located such that the second position on the third arm lies between the said point and the first position, movement of the third arm between the retracted position and the extended position causing the said point to move in a substantially straight line extending perpendicular to the line joining the first and second fixed pivots;
   the fourth arm being adapted to connect at a second position on the fourth arm to a second position on the component; and
   the first arm, second arm, third arm fourth arm, and the first and second connecting arms all lie substantially within a single plane.

2. The assembly according to claim 1, wherein the arms are arranged to be accommodated adjacent to one another or within one another when in the retracted position.

3. The assembly according to claim 1, wherein the first arm has an end and the second arm has an end, and wherein the first position on the first arm is at or adjacent the end of the first arm and wherein the first position on the second arm is at or adjacent the end of the second arm.

4. The assembly according to claim 1, wherein the second arm has an end, the third arm has an end and the fourth arm has an end, and wherein the second position on the second arm is at or adjacent the end of the second arm, the first position on the third arm is at or adjacent the end of the third arm, and the first position on the fourth arm is at or adjacent the end of the fourth arm.

5. The assembly according to claim 1, wherein the length of the first arm is no greater than the distance between the first and second fixed pivots.

6. The assembly according to claim 1, wherein the length of the second arm is no greater than the distance between the first and second fixed pivots.

7. The assembly according to claim 1, wherein the length of the first and second arms is substantially the same.

8. The assembly according to claim 1, wherein the lengths of the first, second and third arms are substantially the same.

9. The assembly according to claim 8, wherein the lengths of the first, second, third and fourth arms are substantially the same.

10. The assembly according to claim 1, wherein the first connecting arm has a first end and a second end, and wherein the pivotable connection between the first connecting arm and the first arm is at or adjacent the first end of the first connecting arm and wherein the pivotable connection between the first connecting arm and the third arm is at or adjacent the second end of the first connecting arm.

11. The assembly according to claim 1, wherein the first arm has a first end and a second end, and wherein the second position on the first arm is at or adjacent the first end of the first arm and wherein the third position on the first arm is at or adjacent the second end of the first arm.

12. The assembly according to claim 1, wherein the second connecting arm has a first end and a second end, and wherein the pivotable connection between the second connecting arm and the first arm is at or adjacent the first end of the second connecting arm and wherein the pivotable connection between the second connecting arm and the second arm is at or adjacent the second end of the second connecting arm.

13. The assembly according to claim 1, wherein the first and second connecting arms are equal in length.

14. The assembly according to claim 1, wherein the third position on the second arm coincides with, the second position on the second arm, such that the second connecting arm is connected to both the second and third arms.

15. The assembly according to claim 1, wherein the movement of at least one of the third or fourth arms is limited; the movement of the third arm being limited to confine the third position on the third arm to move in a straight line; the movement of the fourth arm being limited to confine the second position on the fourth arm to move in a straight line.

16. The assembly according to claim 1, further comprising a first assembly according to claim 1 and a second assembly according to claim 1, the third and fourth arms of the first assembly forming or supporting the fixed pivots for the second assembly.

17. The assembly according to claim 16, wherein the second assembly is inverted with respect to the first assembly.

18. The assembly according to claim 1, wherein the said point on the third arm is at the third position on the third arm.

19. An assembly comprising a first component and a second component, the first component being arranged for movement with respect to the second component, wherein an assembly for converting motion according to claim 1 is provided between the first component and the second component, operation of the assembly providing movement of the first component with respect to the second component.

20. The assembly according to claim 19, wherein the first component is moveable in a linear motion with respect to the second component between a retracted position and an extended position.

21. The assembly according to claim 19, wherein at least one of the first component and the second component are building structures.

\* \* \* \* \*